(12) United States Patent
Tang et al.

(10) Patent No.: US 10,412,022 B1
(45) Date of Patent: Sep. 10, 2019

(54) ON-PREMISES SCALING USING A VERSATILE SCALING SERVICE AND AN APPLICATION PROGRAMMING INTERFACE MANAGEMENT SERVICE

(71) Applicant: Amazon Technologies, Inc., Seattle, WA (US)

(72) Inventors: Kai Fan Tang, Port Coquitlam (CA); Christopher Thomas Lewis, Vancouver (CA); Farzad Moghimi, Vancouver (CA); Stephan Weinwurm, Vancouver (CA); Nayanish Hinge, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 15/298,152

(22) Filed: Oct. 19, 2016

(51) Int. Cl.
*G06F 15/173* (2006.01)
*H04L 12/911* (2013.01)
*H04L 12/26* (2006.01)
*H04L 12/24* (2006.01)

(52) U.S. Cl.
CPC ........ *H04L 47/781* (2013.01); *H04L 41/0627* (2013.01); *H04L 43/0876* (2013.01)

(58) Field of Classification Search
None
See application file for complete search history.

(56) References Cited

U.S. PATENT DOCUMENTS

| | | |
|---|---|---|
| 7,167,799 B1 | 1/2007 | Dolgov et al. |
| 7,529,784 B2 | 5/2009 | Kavuri et al. |
| 7,805,706 B1 | 9/2010 | Ly et al. |
| 8,484,353 B1 | 7/2013 | Johnson et al. |
| 8,621,069 B1 | 12/2013 | Tompkins |
| 8,788,855 B2 | 7/2014 | Cong et al. |
| 8,978,035 B2 | 3/2015 | McGrath et al. |
| 9,256,467 B1 | 2/2016 | Singh et al. |

(Continued)

FOREIGN PATENT DOCUMENTS

| | | | |
|---|---|---|---|
| JP | 2001134453 A | 5/2001 | |
| JP | 2013543171 A | 11/2013 | |

(Continued)

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.

(Continued)

*Primary Examiner* — Umar Cheema
*Assistant Examiner* — Gregory P Tolchinsky
(74) *Attorney, Agent, or Firm* — Davis Wright Tremaine LLP

(57) ABSTRACT

A scaling notification is received that includes a current capacity for a scalable target of a resource. A policy associated with the scaling notification is obtained. A new capacity is computed for the scalable target, based at least in part on the policy and the current capacity of the scalable target. A scaling request is made to an application programming interface endpoint for the scalable target, with the request including a new capacity for the scalable target, thereby causing the current capacity of the scalable target to change to the new capacity.

20 Claims, 9 Drawing Sheets

(56) References Cited

U.S. PATENT DOCUMENTS

| | | |
|---|---|---|
| 9,405,593 B2 | 8/2016 | McGrath et al. |
| 9,477,730 B2 | 10/2016 | Liensberger et al. |
| 2003/0154279 A1 | 8/2003 | Aziz |
| 2004/0040025 A1 | 2/2004 | Lehtinen |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2006/0277206 A1 | 12/2006 | Bailey et al. |
| 2007/0118657 A1 | 5/2007 | Kreitzer et al. |
| 2007/0245331 A1 | 10/2007 | Daynes et al. |
| 2008/0059972 A1 | 3/2008 | Ding et al. |
| 2008/0109898 A1 | 5/2008 | Mohammed et al. |
| 2008/0244611 A1 | 10/2008 | Doyle et al. |
| 2009/0293056 A1 | 11/2009 | Ferris |
| 2010/0153941 A1 | 6/2010 | Borissov et al. |
| 2011/0307591 A1 | 12/2011 | Sugata et al. |
| 2012/0233331 A1 | 9/2012 | Voccio et al. |
| 2012/0233668 A1* | 9/2012 | Leafe .................. G06F 9/44526 726/4 |
| 2013/0191527 A1 | 7/2013 | Ashok et al. |
| 2013/0227563 A1 | 8/2013 | McGrath |
| 2013/0290932 A1* | 10/2013 | Kruglick ............. G06F 11/3672 717/124 |
| 2013/0297964 A1 | 11/2013 | Hegdal et al. |
| 2013/0304616 A1 | 11/2013 | Raleigh et al. |
| 2014/0149986 A1 | 5/2014 | S M et al. |
| 2014/0304404 A1 | 10/2014 | Marr et al. |
| 2015/0135185 A1* | 5/2015 | Sirota .................... G06F 9/5061 718/103 |
| 2015/0154057 A1 | 6/2015 | McGrath et al. |
| 2015/0304176 A1 | 10/2015 | Ting et al. |
| 2015/0365385 A1 | 12/2015 | Hore |
| 2016/0019727 A1 | 1/2016 | Norton et al. |
| 2016/0134557 A1 | 5/2016 | Steinder et al. |
| 2016/0173411 A1* | 6/2016 | Son ....................... H04L 47/822 709/226 |
| 2016/0210578 A1 | 7/2016 | Raleigh et al. |
| 2016/0269427 A1 | 9/2016 | Haugsnes |
| 2017/0199770 A1 | 7/2017 | Peteva et al. |
| 2017/0230266 A1 | 8/2017 | Smola et al. |
| 2017/0289060 A1 | 10/2017 | Aftab et al. |
| 2018/0013656 A1* | 1/2018 | Chen ....................... H04W 24/04 |
| 2018/0234493 A1* | 8/2018 | Ye ........................... H04L 29/12 |

FOREIGN PATENT DOCUMENTS

| | | |
|---|---|---|
| JP | 2014514659 A | 6/2014 |
| JP | 2016541183 A | 12/2016 |
| KR | 20130115553 A | 10/2013 |
| KR | 20170097071 A | 8/2017 |
| RU | 2250490 C2 | 4/2005 |
| RU | 2481618 C2 | 5/2013 |
| WO | 2014047073 A1 | 3/2014 |

OTHER PUBLICATIONS

International Search Report and Written Opinion dated Feb. 4, 2016, International Patent Application No. PCT/US2015/059983, 12 pages.

Soltesz et al., "Container-based operating system virtualization: a scalable, high-performance alternative to hypervisors," ACM SIGOPS Operating Systems Review 41(3):275-287, Mar. 2007.

Van et al., "SLA-aware Virtual Resource Management for Cloud Infrastructures," IEEE Ninth International Conference on Computer and Information Technology, Piscataway, NJ, USA, Oct. 11, 2009, pp. 357-362.

Xavier et al., "Performance evaluation of container-based virtualization for high performance computing environments," Parallel, Distributed and Network-BasedProcessing (PDP), 2013 21st Euromicro International Conference: 233-240, Feb. 2013.

Zhao et al., "Experimental study of virtual machine migration in support of reservation of cluster resources," Proceedings of the 2nd international workshop on Virtualization technology in distributed computing: 1-8, Nov. 2007.

Korean Decision on Grant dated Nov. 20, 2018, Application No. 10-2017-7015815, filed Nov. 10, 2015, 3 pages.

Australian Examination Report No. 1 for Standard Patent Applicaiton dated Apr. 14, 2018, Patent Application No. 2015346530, filed Nov. 10, 2015, 3 pages.

European Communication pursuant to Article 94(3) EPC dated Sep. 9, 2018, Patent Application No. 15804248.1, filed Nov. 10, 2015, 4 pages.

International Search Report and Written Opinion dated Aug. 10, 2017, International Patent Application No. PCT/US2017/032480, filed May 12, 2017, 16 pages.

Japanese Office Action dated Jul. 9, 2018, Patent Application No. 2017-524393, filed Nov. 10, 2015, 6 pages.

Korean Notice of Preliminary Rejection dated May 28, 2018, Patent Application No. 10-2017-7015815, filed Nov. 10, 2015, 4 pages.

Mao et al., "Auto-scaling to minimize cost and meet application deadlines in cloud workflows," Proceedings of 2011 International Conference for High Performance Computing, Networking, Storage and Analysis, Nov. 12, 2011, 12 pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Russian Decision on Grant a Patent for Invention dated Jun. 26, 2018, Patent Application No. 2017116433, filed Nov. 10, 2015, 13 pages.

Thiele et al., "Embedded Software in Network Processors—Models and Algorithms," Lecture Notes in Computer Science 2211:416-34, Oct. 8, 2001.

Uchida, "Construction of Production Environment and Deployment of Docker Containers," WEB+DB Press, vol. 86, pp. 106-113, May 25, 2015.

Australian Notice of Acceptance for Patent Application dated Mar. 25, 2019, Patent Application No. 2015346530, filed Nov. 10, 2015, 3 pages.

Japanese Decision to Grant a Patent dated Apr. 1, 2019, Patent Application No. 2017-524393, filed Nov. 10, 2015, 3 pages.

Korean Notice of Preliminary Rejection dated Mar. 8, 2019, Patent Application No. 10-2019-7005048, filed Nov. 10, 2015, 3 pages.

* cited by examiner

ON-PREMISES SCALING USING A VERSATILE SCALING SERVICE AND AN APPLICATION PROGRAMMING INTERFACE MANAGEMENT SERVICE

BACKGROUND

Computing resource providers leverage large-scale networks of servers and storage devices to enable their customers to execute a variety of applications and web services. This remote, distributed computing model allows the customers to efficiently and adaptively satisfy their computing needs without having to host and maintain the computing infrastructure themselves. Many customers choose to execute some homegrown and/or third party application services in addition to or as an alternative to services provided by the computing resource service provider. Often these other application services are incapable of interfacing with automatic scaling services provided by the computing resource service provider. Consequently, these other application services have difficulty accommodating unanticipated load and traffic spikes without manual intervention, which is inadequate to react to rapid changes in load and network traffic, or expending significant developer resources to design complex custom-built software applications to handle unexpected events.

BRIEF DESCRIPTION OF THE DRAWINGS

Various techniques will be described with reference to the drawings, in which.

DETAILED DESCRIPTION

Figure 1:
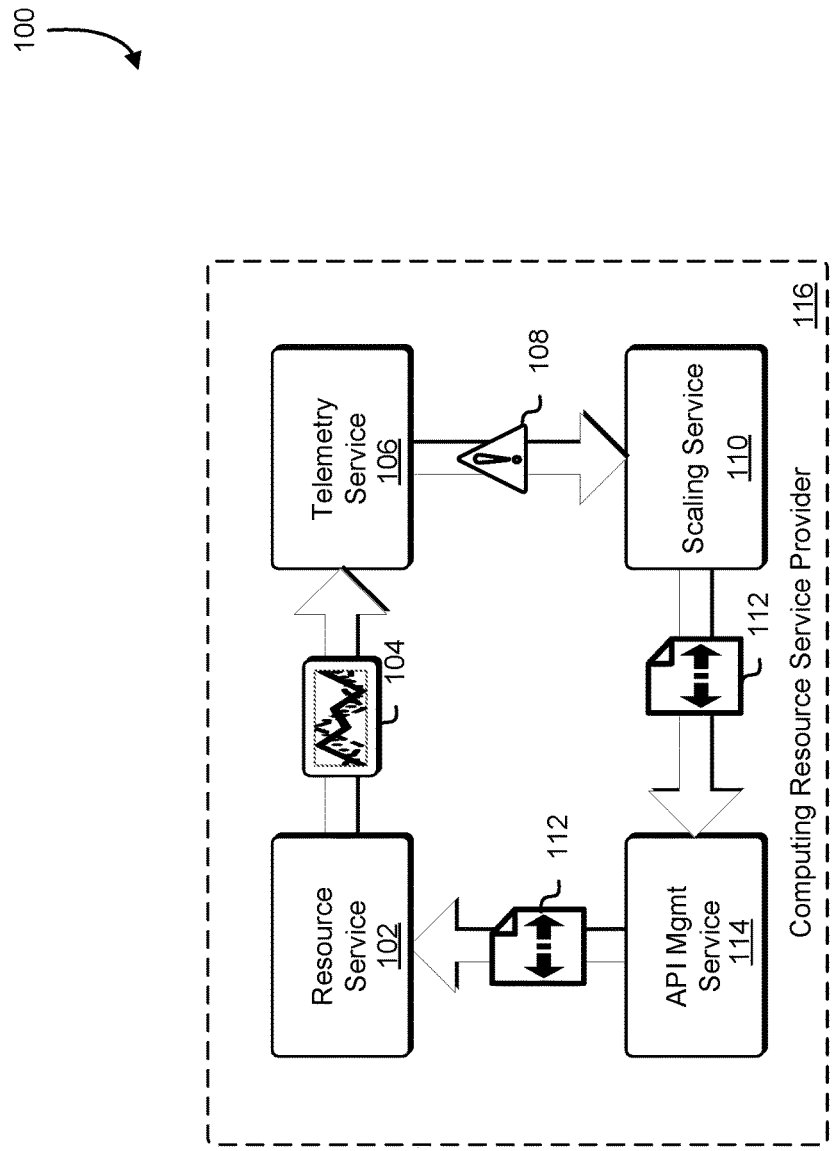
FIG. 1 illustrates an example of a scaling service or an internal scalable resource service in accordance with an embodiment.

Techniques and systems described below relate to a versatile scaling service of a computing resource service provider that utilizes an application programming interface management interface to provide dynamic scaling services to other services that may not themselves be provided or supported by the computing resource service provider. In one example, a customer of a computing resource service provider may use the scaling service of the present disclosure to dynamically scale a scalable dimension of a computing resource of a service that is not itself provided by the computing resource service provider to the customer (i.e., executed independent from services provided by the computing resource service provider to the customer), the service being one or more applications that provide the computing resource to the customer. For example, the service may be a third-party service or a service developed and maintained by the customer. However, such computing resources, although not provided by the computing resource service provider, may themselves be hosted on resources of the computing resource service provider. For example, the customer may run a third party database service that provides database table resources to the customer's application, but the database table resources may be stored at a file storage service of the computing resource service provider. Likewise, the service may run on computing devices hosted by the computing resource service provider or may run on computing devices external to the computing resource service provider environment, such as local to the customer or with another computing resource service provider.

In order to provide a gateway from the scaling service to the customer resource that is unsupported by the computing resource service provider, an application programming interface management service is utilized as a proxy between the scaling service and the customer's service. The customer registers an application programming interface definition that corresponds to the customer's service with the application programming interface management service. In some cases the customer provides his/her own application programming interface definition, while in other cases the computing resource service provider may generate the application programming interface definition for the customer. As a result of registering the application programming interface definition with the application programming interface management service, a uniform resource indicator is created that acts as a destination address for an endpoint to the customer's service.

In the example, the customer's service emits a measurement to a telemetry service. The measurement emitted is a measurement of resource utilization at a particular time. The type of resource utilization corresponds to an alarm condition (i.e., criteria) specified to the telemetry service by the customer. The customer further registers a scaling policy associated with the alarm with the scaling service, with the target of the scaling policy corresponding to the endpoint of the customer's service. If the measurement fulfills the specified alarm condition, the alarm is triggered and the telemetry service sends an alarm notification to a scaling service. Upon receipt of the alarm notification, the scaling service obtains the scaling policy associated with the alarm.

Based on the scaling policy and the current capacity of the target (i.e., current value of the scalable dimension), the scaling service computes a new capacity. The scaling service then makes an application programming interface request that includes scaling information (including the new capacity) to the endpoint corresponding to the target in the scaling policy. The application programming management service, upon receipt of the new capacity, provides the scaling information to the customer's service. Note that the term "provides" is contemplated to include providing information to the customer's service (directly providing) as well as causing the information to be provided to the customer's service (indirectly providing). The customer's service can then determine, from the scaling information, the appropriate action to take to adjust the capacity of the target to meet the new capacity. After the capacity has been adjusted, the customer's service can provide the scaling service with the current capacity of the target as proof that the scaling action was successfully completed.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of computing resource scaling, by providing a scaling service that does not require the provider to separately tailor the scaling service to work with each service that it scales. Additionally, techniques described and suggested in the present disclosure improve the functioning of computing services by enabling dynamic scaling for resources of computing services that cannot be dynamically scaled using existing scaling systems. Moreover, techniques described and suggested in the present disclosure are necessarily rooted in computer technology in order to overcome problems specifically arising with resource scaling by providing a scaling service that can scale third-party services that are not under the control of the computing resource service provider that provides the scaling service.

FIG. 1 illustrates an aspect of an environment 100 in which an embodiment may be practiced. As illustrated in FIG. 1, the environment 100 may include a scalable resource service 102 that emits telemetry measurements 104 to a telemetry service 106 provided to a customer by a computing resource service provider 116 (also referred to as "provider"), where the scalable resource service 102 belongs to the customer. In the environment 100 depicted in FIG. 1, the telemetry measurements 104 have triggered an alarm associated with a scaling policy (not shown) of a scaling service 110 of the computing resource service provider. The triggering of the alarm causes an alarm notification 108 to be sent to the scaling service 110, which causes the scaling service 110 to execute the scaling policy, which causes the scaling service 110 to output scaling information 112 that includes a new capacity for a scalable resource (not shown) of the scalable resource service 102 to an application programming interface (API) management service 114. The API management service 114 provides the scaling information 112 to the scalable resource service 102, whereupon the scalable resource service 102 scales the scalable resource in accordance with the scaling information 112.

Figure 2:
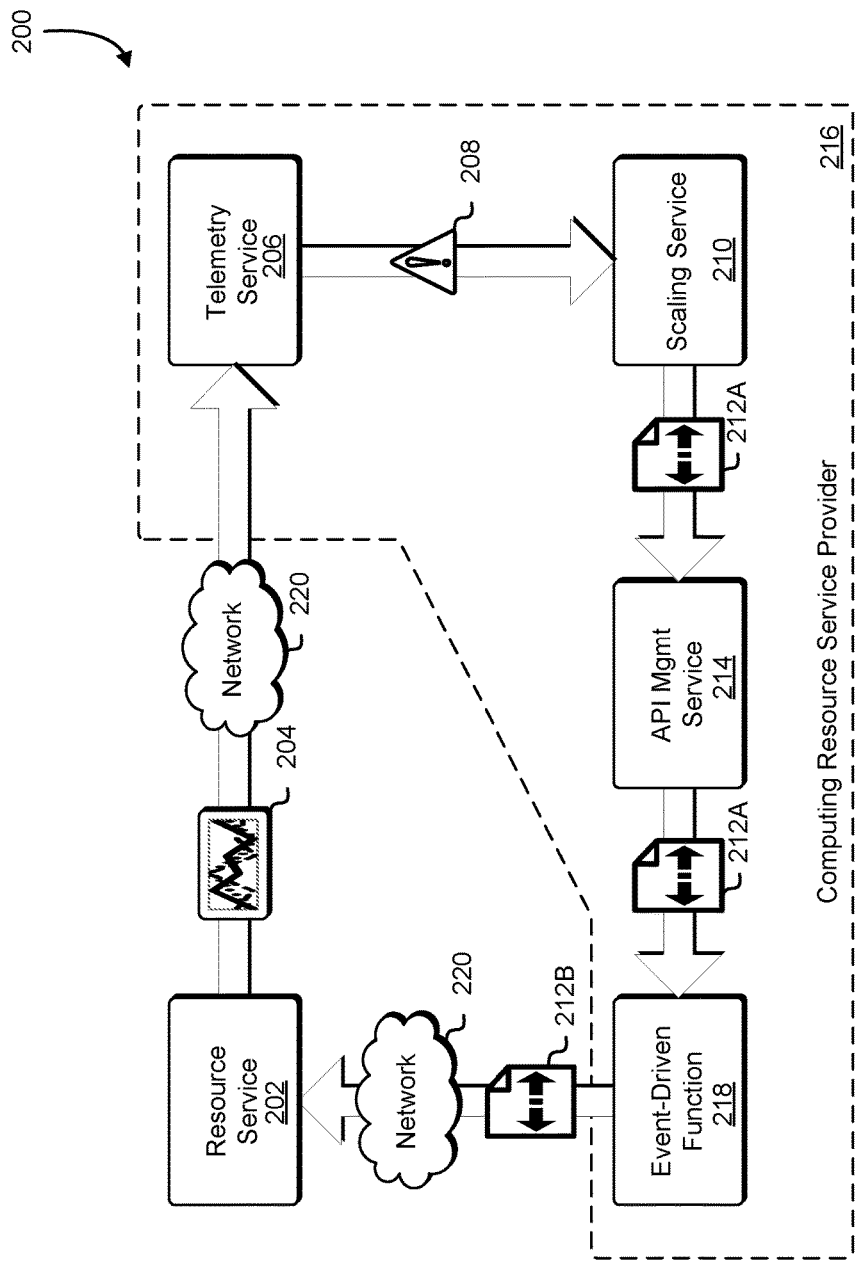
FIG. 2 illustrates an example of a scaling service for an external scalable resource service in accordance with an embodiment.

The scalable resource service 102 may be a service configured to provide access to resources of a computer system (e.g., data processing, data storage, applications, interfaces, permissions, security policies, encryption and/or other such services) where such resources have one or more scalable dimensions. The scalable resource service 102 may be a service (e.g., a database service, a software container service, an authentication service, etc.) that is not configured to communicate directly with the scaling service 110; for example, the customer may be utilizing other services of the computing resource service provider 116 in order to take advantage of certain aspects of the computing resource service provider 116 (e.g., a virtual private cloud service, virtual computing system service, archival storage service, etc.), but the scalable resource service 102 itself may be provided by the customer (or a third party) and not the computing resource service provider 116. The scalable resource service 102 may have a user interface whereby the customer can submit requests (e.g., appropriately configured API calls) to the scalable resource service 102. The scalable resource service 102 may be configured to access one or more other services (e.g., data storage, security services, encryption service, etc.) via one or more service interfaces. In addition, each of the service interfaces may provide secured/protected access to each other via encryption keys and/or other such secured/protected access methods, thereby ensuring secure and protected access between the services. The scalable resource service 102 is depicted as being within the environment of the computing resource service provider 116; however, it is contemplated that, in some embodiments, the scalable resource service 102 may be located external to the computing resource service provider (e.g., on the physical premises of the customer's site), such as is shown in FIG. 2.

The telemetry measurements 104 may be measurements corresponding to a particular telemetry metric. The telemetry measurements 104 may be measurements related to execution of the service 102. Examples of telemetry measurements and metrics include network utilization, network bandwidth, latency measurements, number of hops in a path from a source to a destination in a network, a frequency of communication between services or software applications, an amount of data transferred between services or software applications, network throughput, health levels for persistent storage or for servers, duration (e.g., average, peak, etc.) of task execution, disk input/output rates, processor (real or physical) utilization (e.g., average, peak, thread starvation, etc.), frequency of processor utilization spikes, amount of memory (real or virtual) utilization, request response time (i.e., latency of the application in responding to or fulfilling requests), power consumption by the hardware of the systems hosting the service 102, and so on. In some examples, a "telemetry metric" may refer to the type of measurements being made (e.g., input/output operations per second for specified persistent storage, average processor utilization over time, etc.), and "telemetry measurements" may refer to the measurement value at a particular time.

The telemetry service 106 may be a service configured to aggregate control group measurements (e.g., information about the state of a scalable resource service 102) and container logs, such as the telemetry service described in U.S. patent application Ser. No. 15/194,479, entitled "VERSATILE AUTOSCALING," filed on Jun. 27, 2016 and U.S. Provisional Application No. 62/337,809, filed on May 17, 2016, entitled "VERSATILE AUTOSCALING," the contents of which are incorporated by reference herein in their entirety. Control group measurements include information such as the amount of memory used by processes running under the scalable resource service 102, number of times that a process running under the scalable resource service 102 triggered a page fault, central processing unit usage by processes running under the scalable resource service 102, time during which the central processing units were executing system calls on behalf of processes running under the scalable resource service 102, number of reads and writes to the scalable resource service 102, network traffic used by the scalable resource service 102 on behalf of the customer, and number of input/output operations queued for the scalable resource service 102. The telemetry service 106 may allow the customers to configure the telemetry service 106 to send an alarm notification, such as the alarm notification 108, to another application or service (such as the scaling service 110) when certain control group metrics reach a value relative to a threshold.

The alarm notification 108 may be a notification sent from the telemetry service 106 to the scaling service 110 upon fulfillment of criteria for triggering the alarm. That is, the customer may define parameters that trigger the alarm, which causes the alarm 108 to be sent to the scaling service 110. In some cases, the alarm may be triggered based on metrics of a service different from the scalable resource service 102 to be scaled. For example, a load that exceeds a threshold at another service may trigger the alarm notification 108 to be sent to the scaling service 110, and the scaling policy corresponding to the alarm notification 108 may dictate that a resource of the scalable resource service 102 should be scaled-out.

The scaling service 110 may be a service provided by the computing resource service provider 116 configured to automatically and dynamically manage computing resources that might be subject to demand fluctuation. For example, the scaling service 110 may respond to alarms or other notifications from external applications, such as the alarm notification 108 transmitted to the scaling service 110 by the telemetry service 106, to cause another service, such as the scalable resource service 102, to adjust and/or allocate resource capacity. The scaling service 110 may support scaling actions such as scaling up, scaling down, scaling in, and scaling out. In some examples, the term "scale-out" may refer to the concept of replicating/creating additional resources (e.g., adding additional software containers) of the type being scaled. Likewise, the term "scale-in" may refer to the concept of reducing/terminating a number of resources (e.g., terminating container instances) of the type being scaled. Similarly, the term "scale-up" may refer to increasing a magnitude of a resource (e.g., increasing the size of a storage volume, increasing the computing power (CPUs) for provisioned compute instances, etc.). As well, the term "scale-down" may refer to decreasing a magnitude of a resource (e.g., reducing a read throughput of a database service table).

As described in the present disclosure, upon receiving the alarm notification 108, the scaling service 110 retrieves a scaling policy that corresponds to the alarm. In the present disclosure, a scaling policy defines how to scale a scalable target (e.g., a scalable dimension of a resource of the scalable resource service 102). In particular, the scaling policy provides the parameters required by the scaling service 110 to calculate the new capacity (i.e., scaling amount) for the scalable target. The scaling service 110 or some other service of the computing resource service provider 116 may log each time the scaling service 110 outputs a new capacity for later reference by the customer-owner of the scalable target. This log may represent the scaling history of the scalable resource service 102. It must be noted that in some implementations the customer can issue a command directly to the scaling service 110 to execute the scaling policy. In these cases, the telemetry service 106 and the alarm notification 108 would be bypassed. Likewise, in some implementations scaling policies may execute according to a predetermined schedule (e.g., according to a schedule specified by the customer). In these cases, the scaling service 110 may receive the alarm notification 108 that causes the scaling policy to be executed from a scheduler service, from the customer, or from some service other than the telemetry service 106.

The scaling information 112 specified by the scaling policy may refer to a new capacity calculation by the scaling service 110 in accordance with the scaling policy and the current capacity of the resource of scalable resource service 102. The new capacity reflects an estimate of what the capacity of the resource should be. Receipt of the new capacity by the scalable resource service 102 may cause the scalable resource service 102 to perform a scaling action. A scaling action may refer to an action taken to increase or decrease the desired capacity of a scalable target. It must be noted that outputting the scaling information 112 may cause additional actions to be performed in addition to or alternative to adjusting a capacity of the scalable target. For example, a text message may be sent to an administrator of the scalable resource service 102. Moreover, if a current capacity of the scalable target already matches the new capacity, the scaling action may not be performed or performance may be deferred. The scaling information 112 may be sent in a variety of formats, such as in a message encoded in JavaScript Object Notation (JSON) or some other format. If the scalable resource service 102 is supported by the computing resource service provider 116, the API management service 114 may directly pass the scaling information 112 to the scalable resource service 102 without further transformation. However if the scalable resource service 102 is unsupported by the computing resource service provider 116, the scalable resource service 102 may be unable to recognize the scaling information 112 in the format output from the scaling service 110, and the API management service 114 may need to call a transformation function, such as the event-driven function 218 of FIG. 2, to transform the message containing the new capacity into a format supported by the scalable resource service 102.

In one example, the scaling service 110 receives the alarm notification 108. The scaling service 110 obtains a scaling policy that corresponds to the alarm. In some cases the alarm notification 108 includes an indication of the current capacity of the resource scalable resource service 102 to be scaled. In other cases, the scaling service 110 may query the scalable resource service 102 for a current capacity of the resource to be scaled. In some of these cases, the query and the response to the query may be received through the API management service 114, while in other cases the scaling service 110 queries the scalable resource service 102 directly. In this example, the current capacity of the target being scaled is five. The scaling service 110 calculates, based on the scaling policy and the current capacity, that the new capacity needs to be 10. Thus, the scaling service 110 passes the scaling information 112 of 10 to the API management service 114 which then provides the scaling information 112 to the scalable resource service 102.

The scaling service 110 may further keep a record of scaling activity. For example, the scaling service 110 may log time a new scaling capacity is computed and/or each time the alarm notification 108 is received. Additional information logged may include a transaction identifier (ID) associated with the scaling activity, a timestamp. The record of scaling activity may further include whether or not the scalable resource service 102 successfully implemented the new capacity. Thus, in addition to the new capacity, the scaling information may include other information such as the transaction ID.

The computing resource service provider 116 may provide one or more computing resource services to its customers individually or as a combination of services of a distributed computer system. The one or more computing resource services of the computing resource service provider 116 may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider 116 may communicate with one or more of the services via an interface, which may be a web services interface or any other type of customer interface. Each service provided by the computing resource service provider 116 may have its own interface, and subsets of the services may have corresponding individual interfaces in addition to, or as an alternative to, a common interface. A customer may communicate with the computing resource service provider 116 through a network whereby the network may be a communication network, such as the Internet, an intranet, an internet service provider (ISP) network, and/or some other such network as described below.

In some examples, the term "customer" may refer to a system of a customer entity (such as an individual, company, or other organization) that utilizes services provided by the computing resource service provider 116. Examples of such a system may be an individual computing device, a mainframe, a customer accessible virtual machine instance, or other system capable of communicating with one or more of the provided services.

The API management service 114 may be a service of the computing resource service provider 116 that allows the customer to publish, maintain, monitor, and secure application programming interfaces for use with the customer's services and resources. The API management service 116 may permit the scaling service to interact with scalable resource services that are not configured to receive the scaling information 112 directly from the scaling service 110. The API Management service 116 may have the ability to register a definition of an API. In some embodiments, the API definition may be specified in OpenAPI Specification format (also known as Swagger Specification format). It is contemplated, however, that other formats may be used, such as yet another markup language (YAML), JavaScript Object Notation (JSON), eXtensible Markup Language (XML), representational state transfer (REST)ful API Modeling Language (RAML), or API Blueprint. The customer can build an API to be used as an endpoint/proxy between the scaling service 110 and the scalable resource service 102 of the customer. In some embodiments, the computing resource service provider 116 may, based on parameters for the scalable resource service 102 provided by the customer, provide the customer with an API definition that could be imported to and registered with the API management service 114. In some embodiments, the API management service 114 may have a web service console with a selectable object that causes a scaling endpoint to be generated upon selection. In some embodiments, the computing resource service provider 116 may provide a command line interface to a customer for generating an API endpoint.

Registering the API definition with the API management service 114 may cause the API management service 114 to return a uniform resource indicator (URI) or a series of URIs. The URI may be an address to the API management service 114 and may have an additional identifier appended to it that corresponds to the target dimension being scaled. This URI can be used to direct communications to the endpoint/proxy for the target. Thus, registering the API definition associates the API definition with the endpoint and the scalable dimension that can be specified in a scaling policy (e.g., in the form of the URI). In some embodiments, the scaling service 110 calling the URI triggers an event-driven function, such as the event-driven function 218 of FIG. 2, to execute. In some implementations, the computing resource service provider 116 may have its own resource notation or syntax for identifying resources within its own environment. For embodiments where the scalable resource services reside outside the computing resource service provider environment, such as in the environment 200 of FIG. 2, the scalable resource service or some proxy would need to be accessible by the API management service 114 or by an event-driven function, such as the event-driven function 218. Thus, in the environment 100, the customer may register this internal resource indicator with the API management service 114 to create the endpoint. In this manner, the API management service 114 may function as a service that secures for the customer an endpoint to the scalable resource service 102 using roles, policies, and other security mechanisms of the computing resource service provider.

In some implementations, the URI is a public endpoint; that is, the URI is accessible to computing devices external to the environment of the computing resource service provider 116. In other implementations, the URI is only accessible within a virtual private cloud (VPC). In either case, an API would be defined by the customer for the API management service 114 to be called by the scaling service 110. In some implementations, the computing resource service provider 116 could generate the API definition that the customer could import into the API management service 114. Importing and registering the API definition with the API management service 114 results in associating the API definition with an endpoint to the scalable resource service 102 from the API management service 114. The API definition enables the scaling service 110 to pass parameters for a scaling action (e.g., the scaling information 112) via an API call to the API management service 114 at the URI corresponding to the API definition.

In certain implementations, the computing resource service provider 116 could also provide an API testing service configured to call, at the request of the customer, the API definition in order to validate that the API definition functions as expected. In some implementations, the API testing service may include a mock resource that the customer could use to validate that scaling information is received correctly (e.g., formatted in a manner from which the resource service can determine a scaling action) at the resource service from the event-driven function. Additionally or alternatively, in some implementations the API testing service may simulate traffic from the telemetry service 106 to the scaling service 110 and/or from the scaling service 110 to the API management service 114 to validate, for example, that the scaling policy properly calls out the correct URI or that the new capacity is computed in a manner that meets the expectations of the customer.

In some embodiments, as seen in FIG. 2, a call to the API definition at the API management service 114 triggers an event-driven function that transforms the scaling action information of the API call into a form usable by the scalable resource service 102 for scaling a scalable dimension of a resource of the scalable resource service 102. In this manner, although the API management service 114 adds a level of indirection between the scaling service 110 and the scalable resource service 102, the API management service 114 enables the scaling service 110 to make a generic API request for scaling the scalable resource service 102. That is, the customer can configure the scalable resource service 102 or an event-driven function to receive scaling information and cause the resource of the scalable resource service 102 to be scaled in accordance with the scaling information. In this manner, the scaling service 110 is able to scale any scalable resource that the customer has configured to be scaled. That is, the scaling service 110 need not have information about the scalable resource service 102 or the resource being scaled, as long as the scaling service 110 receives the current capacity of the resource and whether or not the most recent scaling request has been fulfilled. Thus, the scalable resource service 102 may be scaled by the scaling service 110, regardless of the type (e.g., database, storage resource, fleet of computing devices in an Internet of things, etc.) of scalable resource service 102, by using the API defined at the API management service 114 for the scalable resource service 102.

In embodiments, the scaling service 110 initiates the communication to the API management service 114 rather than the scalable resource service 102. However, although the scalable resource service 102 does not or is unable to initiate communication with the API management service 114, the scalable resource service 102 may provide data back to the scaling service 110 in response to a call from the API management service. In this way, communication through the API management service 114 is two-directional but may not be initiated by the resource service 102. The response may be in any of a variety of formats, including JSON. In some cases, if the customer or the scalable resource service 102 called the API endpoint at the API management service 114 that corresponds to the scalable target, the API management service 114 would make a scaling request to the scalable resource service 102, bypassing the scaling service 110. In this manner, the customer may be enabled to make manual scaling requests directly.

In the environment 100, the scalable resource service 102 is shown to be hosted by the computing resource service provider 116. Therefore, it must also be noted that the scalable resource service 102 need not necessarily be a service belonging to a customer of the computing resource service provider 116 but, additionally or alternatively, could be a scalable resource service of the computing resource service provider 116 itself. For example, if the computing resource service provider 116 developed a new service that provided resources to customers of the computing resource service provider 116 and those resources had scalable dimensions, the computing resource service provider 116 could facilitate scaling of the resources of the new service, without having to develop additional applications or interfaces, by simply treating the new service in the same manner as the scalable resource service 102 as described in the present disclosure. Furthermore, the scaling service 110 may be agnostic as to the actual resources being scaled. That is, when the telemetry measurements 104 cause the alarm to be triggered at the telemetry service 106, the scaling service 110 computes the new capacity based on the scaling policy associated with the alarm without having information about the type of resource to which that the new capacity will eventually be applied.

In an example implementation, a customer of the computing resource service provider 116 has a need to dynamically scale a service supported by the computing resource service provider 116, such as a software container service. In some examples, a "software container" (also referred to as a "container" for short) may be an isolated user space instance. That is, a software container may be a lightweight, virtualized instance running under a computer system instance that includes programs, data, and system libraries.

A difference between a software container and a virtual machine is that, while the hypervisor of a virtual machine abstracts an entire hardware device, the software container engine may just abstract the operating system kernel. While software containers run in isolation from each other, they can share the same binaries and library files as needed. Consequently, the software container can be more efficient than a virtual machine in terms of resource usage. In an environment where a customer needs to run multiple copies of the same application, more applications can be run simultaneously in software containers than running the applications simultaneously in separate virtual machines using the same hardware. In some examples, a "software container engine" may refer to underlying software that manages the software containers. Examples of container engines include the Docker container engine and the CoreOS Rocket container engine.

The customer may use a web user interface console or command line interface to register the software container service with the scaling service 116. More information about registering services with a scaling service in this manner can be found in U.S. patent application Ser. No. 15/194,479, entitled "VERSATILE AUTOSCALING," filed on Jun. 27, 2016, and U.S. Provisional Application No. 62/337,809, filed on May 17, 2016, entitled "VERSATILE AUTOSCALING," the contents of which are incorporated by reference herein in their entirety. The customer can then define a scaling policy to associate with the target (i.e., the scalable dimension of the scalable resource of the software container service) to be scaled. The customer could specify conditions (e.g., occurrence of a specified event, the telemetry measurements 104 exceeding a specified threshold, etc.) at the telemetry service that would trigger the alarm and then associate the scaling policy with the alarm. Subsequently, as a result of the alarm notification 108 being sent to the scaling service 110, the scaling service 110 looks up the scaling policy, performs a calculation based on the scaling policy, and makes an API request to the API management service 114 that the capacity of the target should be changed to the new capacity. Thereafter, the scaling service 110 may monitor the capacity of the target until the scaling service 110 determines that the target has reached the new capacity.

In the environment 100, the telemetry measurements 104 are emitted from the scalable resource service 102 to the telemetry service 106. As a result of the telemetry measurements 104 meeting and alarm condition specified by the customer, the telemetry service 106 sends the alarm notification 108. However, it is also contemplated that rather than being triggered by measurements, the alarm may be triggered by the occurrence of one or more specified events (also referred to as a "telemetry event"). Examples of such events include detecting a message having been sent to a message queuing service or detecting that a certain function has been executed in a software container. Additionally or alternatively, in some embodiments, scaling policies can be triggered according to a predefined schedule. For example, the customer may set a scaling schedule that triggers a scaling policy at 6:00 PM every day.

It must also be noted that although depicted in FIG. 1 as originating from the scalable resource service 102, the telemetry measurements 104 need not necessarily be emitted from the scalable resource service 102. That is, the telemetry measurements 104 may originate from another service or source separate from the scalable resource service 102, or even from a service external to the computing resource service provider 16. For example, the telemetry measurements 104 could be received by the telemetry service 106 from a separate data storage service utilized by the scalable resource service 102.

Likewise, the scope of the present disclosure should not be limited to embodiments having a telemetry service or analogue. That is, it is contemplated that the scaling policy of the scaling service 110 that triggers the scaling service 110 to output the scaling information 112 may be directly triggered by some other entity, such as the customer (e.g., via a web service console, command line interface, etc.) or another application or service associated with the customer (e.g., a scheduling service, a load-balancing service, etc.).

After the scalable resource service 110 has received the scaling information 112, the scaling service 110 may need to determine whether the target has been scaled according to the scaling information 112 (i.e., whether a scaling action to scale the target to the new capacity has been successfully performed). In some embodiments, this determination may be made by the scaling service 110 making a request directly to the scalable resource service 102 for a current capacity of the target (e.g., such as by making a Describe( ) API call to the scalable resource service 102 that responds with a description of the current state of the scalable resource service). Alternatively, the scalable resource service 102 may be configured to automatically send a notification to the scaling service 110 upon completion of the scaling action. In another alternative embodiment, the scalable resource service 102 may respond to the call from the API management service 114 with a response that indicates that the scaling action has been fulfilled.

In some cases, if a request from the scaling service 110 for a description of the current state of the target is not in a format recognizable by the scalable resource service (i.e., not in a format from which the scalable resource service 102 can derive a scaling action), another API could be registered by the customer with the API management service 114 that would trigger an event-driven function (implemented by the customer) to execute that would transform the description request from the scaling service 110 into a request format recognizable by the scalable resource service 102 (i.e., in a format from which the scalable resource service 102 can derive a scaling action). Similarly, the customer could create another event-driven function that would transform the response from the scalable resource service 102 into a format compatible with the scaling service 110 so that the scaling service 110 is able to determine whether the scaling action has been successfully completed.

As a more specific example, a customer utilizes a virtual computing system service of the computing resource service provider 116 to host the customer's software container engine. In this example, the customer has a scheduler application for the software container engine that neither supports direct communication from the scaling service 110 nor is unsupported by the scaling service 110. The customer would like to register the resources of the software container engine with the computing resource service provider 116 for scaling (e.g., increasing or decreasing software container tasks). The customer configures and registers an API definition with the API management service 114, thereby associating the API definition with an endpoint to the target being scaled The API management service 114, upon receiving the scaling information 112 from an API call at the endpoint URI by the scaling service 110, forwards that information to the scheduler application of the software container engine. The customer configures the virtual machines hosting the software container engine to emit processor utilization metrics to the telemetry service 106 and configures the telemetry service 106 to send the alarm notification 108 if the processor utilization metrics exceed 80 percent. The customer configures a scaling policy that, as a result of receiving the alarm notification 108, computes a new capacity equal to the current number of software container tasks being executed by the software container engine plus five. Note, also, that the customer could configure another telemetry service alarm and scaling policy to balance the increase should demand decrease; for example, the customer could configure an alarm notification to be transmitted if processor utilization metrics fall below 20 percent and the customer could configure a scaling policy to cause the scaling service 110 to compute a new capacity equal to the current number of software container tasks minus five.

In this example, the scaling service 110 outputs the new capacity as an API call with the scaling information 112 to the API management service 114. The API management service 114, in turn, provides the new capacity to the scheduler application. In this example, the scheduler application causes an additional five software container tasks to be launched. The scaling service 110, in order to discover whether the five software container tasks have indeed been launched, then makes a request to the scheduler application for a current status. This request may itself be passed through an API with the API management service 114 and the response from the scheduler application may be transformed to a format recognizable by the scaling service 110. Upon notification that the five software container tasks have been successfully launched, the scaling service 110 may log that the scaling action was successfully completed.

In some implementations, the functionality for the customer interfacing with the API management service 114 and/or the scaling service 110 in the manner described in the present disclosure may be provided by the computing resource service provider 116 in a command-line interface or a software development kit (SDK). In other implementations, the customer may be enabled, via a web interface or service console, to register the scalable resource service 102 and/or appropriate API endpoints and/or obtain a current capacity of the target.

FIG. 2 illustrates an aspect of an environment 200 in which an embodiment may be practiced. As illustrated in FIG. 2, the environment 200 may include a scalable resource service 202 located outside of an environment of the computing resource service provider 216 (for example, at a customer site, at a data center not under the control of the computing resource service provider, etc.). In the environment 200 depicted in FIG. 2, measurements 204 are emitted from the scalable resource service 202 to a telemetry service 206 via a network 220. The measurements 204 may trigger an alarm and sending of an alarm notification 208, which causes the scaling service 210 to execute a corresponding scaling policy. The corresponding scaling policy causes the scaling service 210 to calculate a scaling information 212A for a scalable resource (not shown) of the scalable resource service 202. The scaling information 212A is output by the scaling service 210 to an API management service 214. Providing the scaling information 212A causes an event-driven function 218 to execute, which takes the scaling information 212A and transforms it into transformed scaling information 212B usable by the scalable resource service 202 to change a dimension of a resource of the scalable resource service 202. The event-driven function 218 then provides the transformed scaling information 212B to the scalable resource service 202 via the network 220. Note that the environment 200 is intended to be illustrative, and that other implementations where the resource service 202 is located external to the computing resource service provider 216 may have more, fewer, or different components than depicted in FIG. 2. For example, in some implementations, the event-driven function 218 is not present and the API management service 214 provides the scaling information 212A directly to the resource service 202. In some of these implementations, the API management service transforms the scaling information 212A into the transformed scaling information 212B itself. In others of these implementations, the scaling information 212A is transformed by an application or proxy at the site of the resource service 202 or some other external site. In still others of these implementations, the scaling information 212A is usable by the resource service 202 without being transformed and is consequently provided to the resource service 202 directly and untransformed.

In environment 200, a customer of the computing resource service provider 216 has a need to dynamically scale a service that is unsupported by the computing resource service provider 216. In this environment, the customer can define an API management service endpoint (receiving an endpoint URI) that the customer will register with the scaling service 210. The customer can then configure the alarm with the telemetry service 206. The customer may further create the event-driven function 218 or some other function to transform a request from the scaling service 210 to the API management service 214 in a manner usable by the scalable resource service 202. In this manner, when the alarm is triggered and the alarm notification 208 is sent to the scaling service 210, the scaling service 210 examines the corresponding scaling policy, calculates the new capacity 212, and provides the new capacity to the API management service 214, which acts as a proxy between the computing resource service provider and the target to be scaled. That is, the API management service 214 passes the new capacity 212 to the scalable resource service 202, either directly (as described above) or indirectly (via the event-driven function 218 or other mechanism). This allows the flexibility to define scaling for practically any service, supported or unsupported by the computing resource service provider 216. As long as the customer can define the mapping from the API management service 214 to the scalable resource service 202, the customer can effectively register any service with scalable resources to be scaled by the scaling service 210.

The computing resource service provider 216 may be similar to the computing resource provider 116 described in FIG. 1. The network 220 may be a path of communication between a computing device hosting the scalable resource service and computing devices of the computer resource service provider. Examples of the network 220 include the Internet, a local area network, a wide area network and Wi-Fi. The scalable resource service 202 may be a service configured to provide access to resources of a computer system, similar to the scalable resource service 102 of FIG. 1. However, distinguished from the scalable resource service 102, the scalable resource service 202 is depicted in FIG. 2 as being located external to the computing resource service provider 216. That is, the scalable resource service 202 may be located at the customer site, in a data center not under the control of the computing resource service provider 216, or with a different computing resource service provider than the computing resource service provider 216 that hosts the scaling service 210 and/or the API management service 214.

The measurements 204 may be measurements corresponding to a particular telemetry metric, such as the telemetry measurements 104 of FIG. 1. Thus, it is contemplated that the scalable resource service 202 of the customer can emit measurements to the telemetry service 206 from outside the environment of the computing resource service provider 216 that can be used to trigger the alarm. However, it is also contemplated that the measurements 204 may represent other values, events, commands, or signals than telemetry metrics (e.g., a notification, occurrence of an event, a command from the customer to execute a scaling policy, etc.). Is further contemplated that, in some embodiments the telemetry service 206 would not be needed. That is, the customer may utilize some other monitoring service, not under the control of the computing resource service provider, that directly calls (such as a call to an InvokeScalingPolicy( ) API of the scaling service 210) the scaling service 210 in response to fulfillment of some customer-specified criteria.

The telemetry service 206 may be a service configured to aggregate control group measurements, similar to the telemetry service 106 of FIG. 1. The alarm notification 208 may be a notification sent from the telemetry service 206 to the scaling service 210, similar to the alarm notification 108 of FIG. 1. The scaling service 210 may be a service provided by the computing resource service provider 216 configured to compute new capacity for scalable resources, similar to the scaling service 110 of FIG. 1.

The scaling information 212A may be a new capacity for a dimension of a scalable resource of the scalable resource service 202 calculated by the scaling service 210. It is noted that the scaling information 212A may include additional or alternative information; for example, the scaling information could include a unit value and information about whether the dimension should be scaled up, down, in, or out. As another example, the scaling information could include an identifier corresponding to the target being scaled. The scaling information 212, like the scaling information 112 of FIG. 1, may be sent in a variety of formats, such as in a message encoded in JSON or some other format. The API management service 214 may then need to call the event-driven function 218 to transform the message containing the scaling information 212A into the transformed scaling information expected by the scalable resource service 102. In this manner, the customer need not make any changes to the actual scalable resource service 202; i.e., the customer need only create the event-driven function 218 and associate the event-driven function 218 with an endpoint at the API management service 214.

In some cases, the scaling information 212A may not be in a format that is recognizable by the scalable resource service 202. Such a case is depicted in the environment 200 where the customer has created an event-driven function 218 that, upon execution, receives the scaling information 212A as input and outputs the transformed scaling information 212B to the scalable resource service 202. That is, the scaling service 210 outputs the scaling information 212A to an endpoint for the scalable resource service 202 at the API management service 214. Receipt of the scaling information 212A at the API management service 214 is an event that triggers execution of the event-driven function 218, which receives the scaling information 212A as input. The event-driven function 218 transforms the scaling information 212A into information that is recognizable by the scalable resource service 202 as a new capacity for the target being scaled.

In an example, the scalable resource service 202 is a service that hosts virtual machine instances. In the example, the band for virtual machine instances increases above a threshold, causing the alarm to trigger and the alarm notification 208 to be sent, which, upon execution of a corresponding scaling policy, results in the scaling service 210 determining that the number of virtual machine instances should be increased (e.g., from three to five). The scaling service 210 outputs the new capacity of five to the API management service 214. However, the scalable resource service 202 in this example does not recognize what to do upon receipt of a new capacity amount. On the other hand, the scalable resource service 202 in this example supports launching a new virtual machine instance one at a time. Thus, the new capacity of five is forwarded to the event-driven function 218 which determines that three virtual machine instances are already running and, therefore, two additional virtual machine instances need to be launched. Execution of the event-driven function 218 subsequently causes the transformed scaling information 212B to be sent, two separate commands to launch a new virtual machine instance to the scalable resource service 202, thereby fulfilling the new capacity.

The API management service 214 may be similar to the API management service 114 of FIG. 1. The API management service 214 can allow the customer to create a custom API for an event-driven function, whereby calling the custom API causes the event-driven function (e.g., the event-driven function 218) to execute. Thus, the scaling service 210 sends the scaling information 212A to the API management service 214, which then causes the event-driven function 218 to transform the scaling information 212A into the transformed scaling information 212B. The transformed scaling information 212B is then provided to the scalable resource service 202.

As described in reference to FIG. 1, the scaling service 210 must subsequently determine whether the target has been successfully scaled as a result. The scaling service 210 may do so by querying the scalable resource service 210 for information regarding the current state of the target being scaled. If the scalable resource service 202 does not recognize the format of a query by the scaling service 210, the customer may implement a first event-driven function or some other interface to transform the query from the scaling service 110 into a request format recognizable by the scalable resource service 102. Similarly, the customer could implement a second event-driven function that would transform the response from the scalable resource service 202 into a format compatible for receipt by the scaling service 210. In some embodiments, there need not be separate first and second event-driven functions but, rather, the response from the scalable resource service 202 to the query from the first event-driven function could instead be received and transformed by the first event-driven function and provided to the scaling service 210. In either case, in this manner the scaling service 210 is enabled to determine whether the scaling action has been successfully completed.

The event-driven function 218 may be a function that is configured to execute in response to a particular API call at the API management service 214 by the scaling service 210. The event-driven function 218 may be a function created by the customer implemented with an event-driven compute service (which may also be referred to as an "algorithm execution service" or a "just-in-time execution service") of the computing resource service provider or may be a third party service maintained by the customer or another computing resource service provider. Note that, for expressions in the present disclosure regarding "functions" or other type of executable instructions performing operations that such executable instructions do not ordinarily or literally perform unaided (e.g., "transforming," "submitting," "providing," etc.), it is to be understood that the function is being executed by hardware, thereby causing the hardware to perform the specified operations as a result.

As noted, the event-driven function 218 may be developed and utilized by the customer to transform the scaling information 212A into transformed scaling information 212B usable by the scalable resource service 202. For example, in one scenario the customer has an API that allows the customer to update a desired capacity of a resource of the scalable resource service 202. However, in this scenario, the customer the API parameter is named "required_units" while the parameter name used by the scaling service 210 is called "desired capacity." In this scenario, the scaling service 210, as a result of receiving the alarm notification 208, may compute a new capacity of eight and output (as part of the scaling information 212A) a message that states, "desired_capacity=10." However, because the customer API would not recognize "desired_capacity=10," the event-driven function 218 receives this message instead and transforms the message into (as part of the transformed scaling information 212B) "required_units=10," passing the transformed message to the scalable resource service 202.

In a more complex scenario, the customer does not have an API that causes the scalable resource service 202 to adjust to a desired capacity but, instead, has an API that causes the scalable resource service 202 to increase or decrease the capacity by one unit per execution. In this scenario, the scalable resource service 202 has a current capacity of five and, similar to the previous scenario, the scaling service 210 outputs a message that states, "desired_capacity=10." However, because the customer API would not recognize "desired_capacity=10," the event-driven function 218 receives this message instead and calls the scalable resource service 202 "increaseCapacity( )" API five times to achieve the desired capacity of 10. Similarly, if the current capacity is 10 and the new capacity computed is five, the event-driven function 218 would be designed to call the scalable resource service 202 "decreaseCapacity( )" API five times to achieve the desired capacity of five.

Thus, in the embodiment depicted in FIG. 2, the customer would be responsible for knowing how their scalable resource service 202 scales its resources and build the event-driven function 218 accordingly. It must be noted that, rather than using the event-driven function 218, the same effect could be achieved with another service external to the computing resource service provider 216, such as a proxy service, that lies in the data path between the API management service 214 and the scalable resource service 202.

It must be noted that the event-driven function 218, a proxy service between the scaling service 210 and the scalable resource service 202, or the scalable resource service 202 may cause additional or alternative actions to be performed beyond scaling a dimension of a resource of the scalable resource service 202. For example, the event-driven function 218 could be configured to additionally send a notification to an administrator of the scalable resource service 202, notifying the administrator of the scaling activity. As another example, based on the scaling information received, the scalable resource service 202 may not only scale the target but may also scale related resources; for example, if the target is a size of a database, the scalable resource service may not only increase/decrease the size of the database but may also increase/decrease compute power of the machine hosting the database. In fact, the customer need not configure the scalable resource service to scale any resources automatically in response to scaling information from the scaling service 210. For example, the scaling service 210 might provide the event-driven function 218 with a new capacity, and the event-driven function 218 may, rather than transmitting transformed scaling information to the scalable resource service 202, instead notify a purchasing director of the customer of the recommended capacity. In this example, the purchasing director may need to approve, manually, scaling decisions as such scaling decisions may affect customer costs.

However, in some embodiments, the scaling service 210 will not consider the scaling action to be complete until it has received confirmation. If the scaling service 210 has not received confirmation after a certain amount of time, the scaling service 210 may re-send the scaling information 212A until such time that the scaling service receives confirmation or the scaling service 210 logs that confirmation could not be obtained (e.g., no response, error, etc.) and stop sending the scaling information 212A. The confirmation need not necessarily be received from the scalable resource service 202, but may be received from a different entity or may be received indirectly, such as through the API management service 214 as a response to an API call configured to request a resource capacity of the scalable resource service 202.

Figure 3:
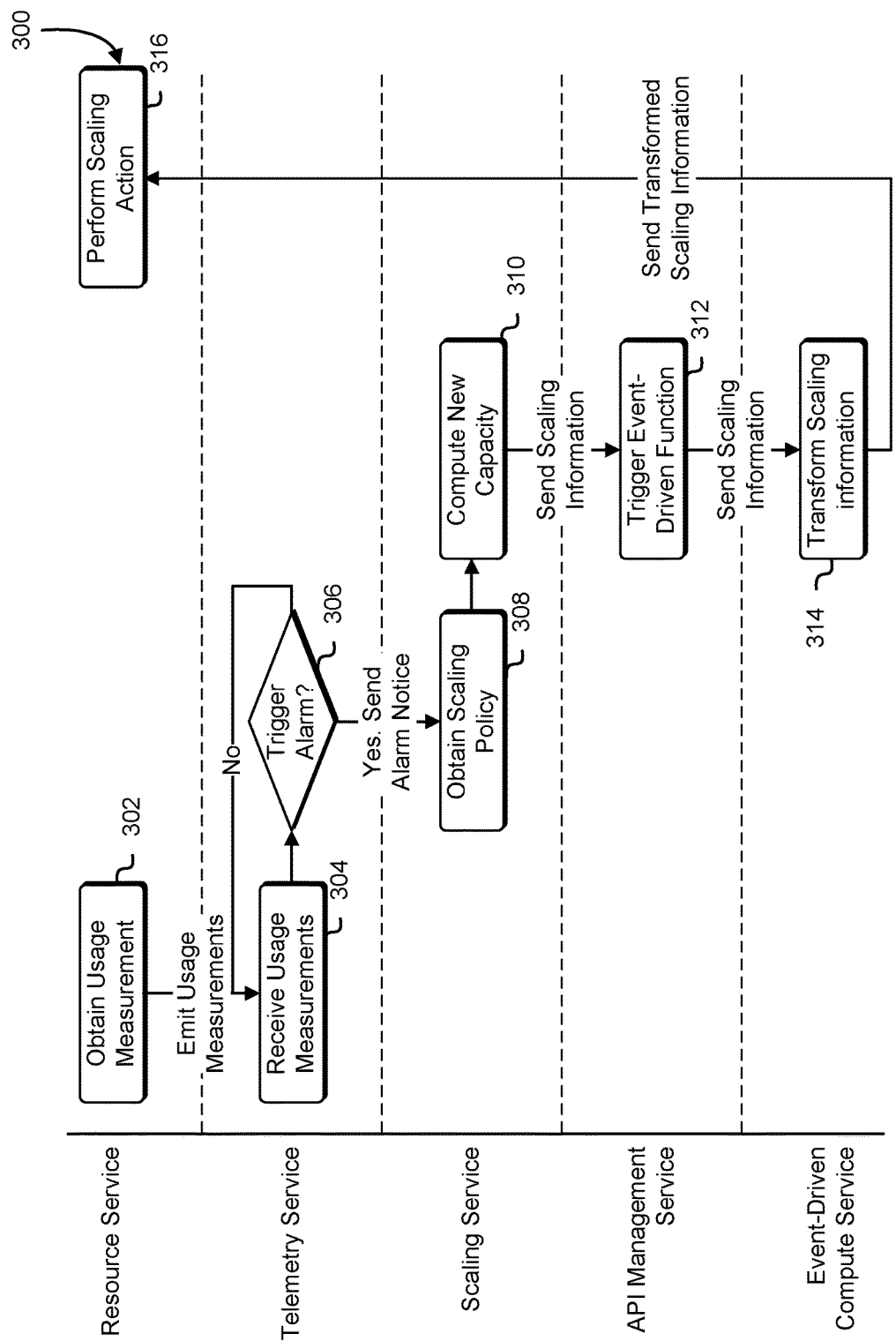
FIG. 3 illustrates an example of a workflow for scaling in accordance with an embodiment.

FIG. 3 is a swim diagram illustrating a workflow 300 of an embodiment of the present disclosure. Specifically, FIG. 3 depicts processes being performed by a resource service (such as the scalable resource service 102 or the scalable resource service 202 of FIGS. 1 and 2 respectively), a telemetry service (such as the telemetry service 106 or the telemetry service 206), a scaling service (such as the scaling service 110 or the scaling service 210), an API management service (such as the API management service 114 or the API management service 214), and an event-driven function (such as the event-driven function 218). The processes of the workflow 300 begin at block 302 where a resource service obtains a usage measurement. The resource service may be under the control of a customer of a computing resource service provider, such as the computing resource service provider 116 or the computing resource service provider 216. As noted, the usage measurement may be a measurement, such as the telemetry measurements 104 or measurements 204, of a particular resource at a particular time that corresponds to a telemetry metric that the customer has specified to be received by the telemetry service.

The resource service provides the measurements to the telemetry service where the customer has configured an alarm to be triggered in the event that the measurements meet specified triggering criteria. At block 304 the telemetry service receives the aforementioned measurements and, at decision 306, determines whether the received measurements trigger the alarm. If not, the telemetry service continues to receive measurements from the resource service until the alarm is triggered. As a result of the alarm being triggered, the telemetry service sends the alarm notification to the scaling service.

At block 308 the scaling service receives the alarm notification and retrieves the scaling policy that corresponds to the alarm. At block 310 the scaling service computes, based on a current capacity of the target being scaled and the scaling policy, a new capacity for the target. The current capacity of the target may be received with the alarm notification or may be separately obtained from the resource service by the scaling service. The scaling service then makes an API call to a URI of the API management service that corresponds to an endpoint for the target, with the API call including scaling information. The scaling information may include the new capacity, an identifier corresponding to the target being scaled, and/or other information related to the scaling action. The scaling service may additionally record in a log that the scaling information was output at this time.

At block 312, the API management service receives the API call to the URI that includes the scaling information from the scaling service. Receipt of the API call triggers an event-driven function at the event-driven compute service. At block 314, the event-driven function takes the scaling information and transforms the scaling information into transformed scaling information recognizable by the resource service for scaling the target. The event-driven function provides the transformed scaling information back to the resource service. Finally, at block 316 the resource service performs the scaling action to the target that corresponds to the new capacity in the transformed scaling information. Note that the workflow 300 is intended to be illustrative, and that other implementations may have more, fewer, or different components than depicted in FIG. 3. For example, in some implementations, the event-driven compute service is not present and the API management service provides the scaling information directly to the resource service. In some of these implementations, the API management service transforms the scaling information into the transformed scaling information itself. In others of these implementations, the scaling information is transformed by an application or proxy at the site of the resource service or some other location. In still others of these implementations, the scaling information is usable by the resource service without being transformed and is consequently provided to the resource service directly and untransformed.

Figure 4:
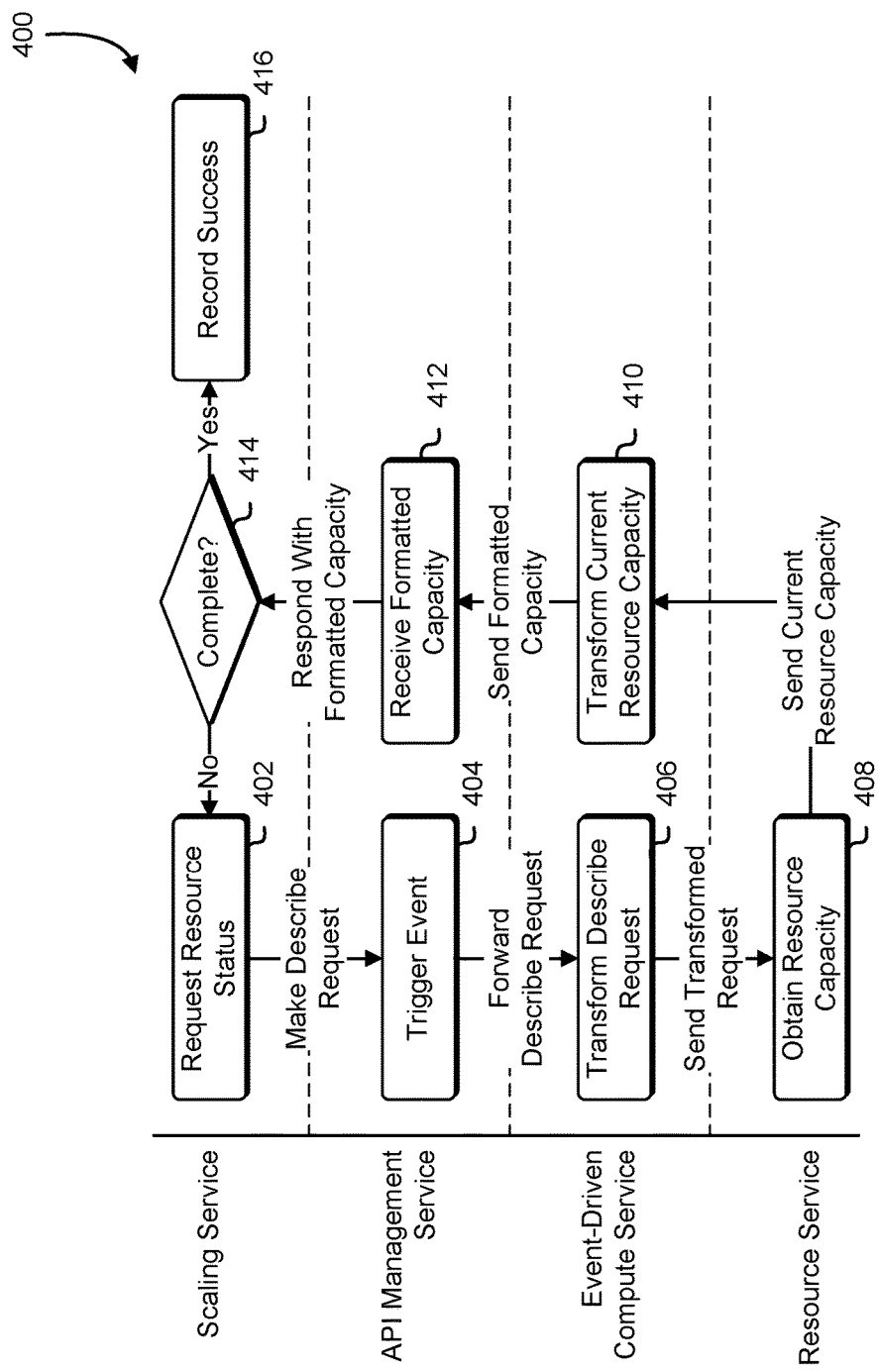
FIG. 4 illustrates an example of a workflow for determining whether scaling is complete in accordance with an embodiment.

FIG. 4 is a swim diagram illustrating a workflow 400 of an embodiment of the present disclosure. Specifically, FIG. 4 depicts processes being performed by a scaling service (such as the scaling service 110 or the scaling service 210 of FIGS. 1 and 2 respectively), an API management service (such as the API management service 114 or the API management service 214), an event-driven function (such as the event-driven function 218), and a resource service (such as the scalable resource service 102 or the scalable resource service 202). The purpose of the workflow 400 is for the scaling service to determine whether a scaling action has been successfully completed by the resource service.

At block 402 the scaling service, after having computed a new capacity and output the scaling information such as described in the workflow 300 of FIG. 3, seeks to determine whether the scaling activity has been successfully performed. As such, the scaling service makes an API call requesting the current capacity of the resource service. In the illustrative example depicted in FIG. 4, the resource service is not configured to recognize direct requests from the scaling service and, therefore, the request must be transformed by transformation engine (e.g., an event-driven function) somewhere between the scaling service and the resource service. Thus, in this scenario, the scaling service makes its API call to an API endpoint of the API management service that corresponds to the appropriate event-driven function to transform the request.

At block 404 the API management service receives the API request from the scaling service at the endpoint, thereby triggering an event-driven function to execute at the event-driven compute service. The API management service provides the API request to the event-driven function and at block 406, the event-driven function transforms the API request into an API request (for capacity) that is recognizable by the resource service. The event-driven function then provides the transformed request to the resource service.

At block 408 the resource service determines what the current capacity of the target is and provides that back to the event-driven function as a response to the transformed request. At block 410, the event-driven function transforms the current capacity into a format recognizable by the scaling service and provides that formatted capacity as a response to the API request made to the event-driven function by the API management service. At block 412 the API management service receives the formatted capacity and provides it back to the scaling service in response to the API request made to the API management service by the scaling service.

At decision 414, the scaling service makes a determination whether the formatted capacity indicates that the target has been successfully scaled in accordance with the scaling information output in the workflow 300 of FIG. 3. If not, the scaling service may repeat blocks 402-14 until the scaling service determines at decision 414 that the scaling was successfully completed or until the scaling service returns an error or until the telemetry service of FIG. 3 indicates that the alarm condition is no longer in effect. Otherwise, if the scaling service decides that scaling was successfully completed, the scaling service may, at block 416, log that scaling was successfully completed (e.g., along with a timestamp). The workflow 400 may subsequently end until another scaling action is taken (e.g., workflow 300).

Figure 5:
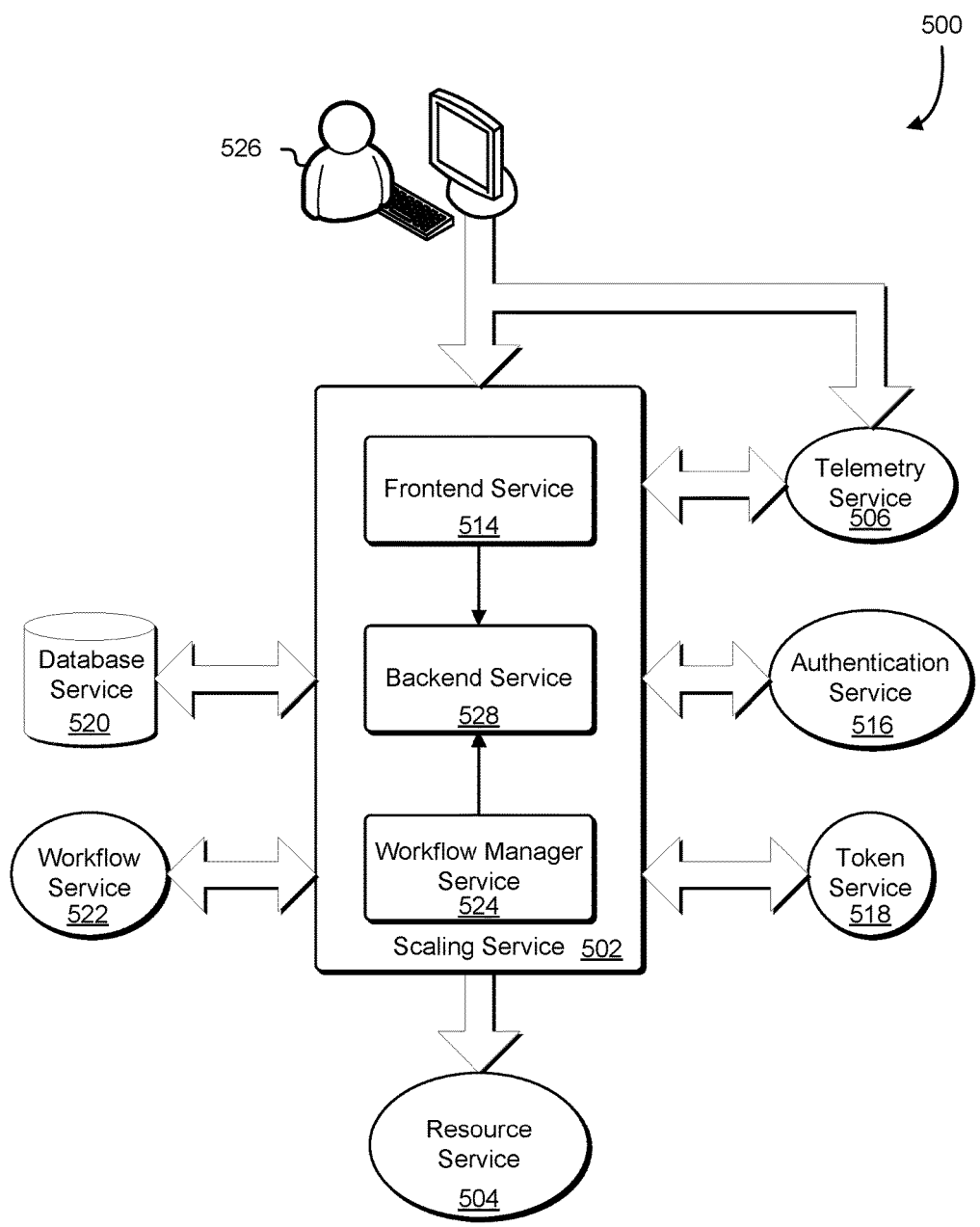
FIG. 5 illustrates an example of a scaling service in accordance with an embodiment.

FIG. 5 illustrates system architecture of a scaling service 502 that may interact with other services in an environment 500 in which an embodiment may be practiced. As illustrated in FIG. 5, the environment 500 may include a scaling service 502 comprising a scaling service frontend 514, a scaling service backend 528, and a scaling service workflow manager 524. A customer 526 may set scaling policies via the scaling service frontend 514 and may also set alarm actions with a telemetry service 506 that trigger the scaling policies. Calls made to the scaling service frontend 514 may be authenticated by an authentication service 516. Scaling policies may be stored with the database service 520 by the scaling service backend 528, and scaling actions may be initiated through a scaling service workflow manager 524 by the scaling service backend 528. The customer 526 may specify, via a policy/role management service (not shown), a role to be assigned to the scaling service 502, and the scaling service 502 may obtain a token from a token service 518 as proof that the scaling service 502 has been granted that role. Upon triggering a scaling policy, the scaling service 502 may obtain a resource's current capacity and set the resource's capacity for its respective resource service of the resource services 504 under the specified role.

The scaling service frontend 514 may be the frontend for the scaling service 502. That is, the scaling service frontend 514 provides the customer 526 with a single endpoint. The customer 526 may use an interface console or call an API to instruct the scaling service 502 to create scaling policies for their resources. That is, the customer 526 may submit scaling service API requests to the scaling service frontend 514. The scaling service frontend 514 may pass the requests through to the scaling service backend 528. For example, the customer 526 may use a service interface (i.e., via the scaling service frontend 514) to register a scalable target. The scalable target may refer to a dimension of the resource that the customer 526 may scale. In some examples, the scalable target may include a service ID or namespace, a resource ID, and/or a dimension name or identifier such that the scalable target uniquely identifies which dimension of the particular resource of the particular service to scale. Once the scalable target is registered, the customer 526 may create a scaling policy to be associated with the scalable target.

The scaling service backend 528 may be the backend data and/or control plane for the scaling service 502. The scaling service backend 528 may receive and process scaling requests (e.g., via a control plane) and create, read, update, and delete in response to corresponding API requests (e.g., via a data plane). For scaling requests, the scaling service backend 528 may calculate a new desired capacity and launch a scaling workflow via the workflow service 522, which in itself may interact with the target resource and use a control plane service to track and record the interaction. Storage of the policies, scaling activities, and identities of scalable targets may be stored with a database service 520, and then a workflow service 522 may be used to orchestrate the scaling workflow. The computing resource service provider may provide general APIs for managing the scaling of various resource service types so that the customer 526 need learn only one API to scale all their resources. In order for the scaling service 502 to determine which resource to scale, a resource must be uniquely identifiable and have one or more scalability measures (e.g., scalable dimensions) that may be independently increased or decreased. That is, the customer 526 must identify the resource they want to auto-scale. For example, in some implementations a resource can be identified by a URI. Additionally or alternatively, in some implementations a resource can be identified by a service name specified by the customer 526.

A resource may be unambiguously identified based on the partition, service, region, account ID, and/or resource identifier, and the combination of service namespace, resource ID and scalable dimension may uniquely identify a scalable target. Among these pieces of information, the scaling service may only require the service and resource identifier (ID) from the customer 526. Using a combination of service namespace and resource ID may have advantages over using URIs. For example, the customer 526 may describe the customer's resources registered in the scaling service 502 with reference to service namespace and resource ID or by service namespace only and, in this way, the customer 526 need not construct or keep track of URIs. Such an implementation would then accommodate resource services that do not use URIs.

In some embodiments, the customer 526 can specify a URI in the resource ID, and the system will assume that the service namespace is the one in the URI. In some implementations, alternative to or in addition to individual resource scaling, the scaling service 502 provides application scaling. In some examples, "application scaling" may refer to scaling a group of related resources that form an application stack of the customer 526. For the purpose of scaling, the group of related resources, itself, would be a resource and would be uniquely identifiable. Therefore, the concepts of service namespace and resource ID also apply to application scaling.

However, if the customer 526 only intends to scale one resource, the scaling service need not have to know that it belongs to a group. On the other hand, if the intention is to scale the group as a whole, the customer 526 should consider scaling the group versus scaling the resources in it. It should be the job of the scaling service 502 to determine how to scale the resources. Regarding scalable dimensions, identifying the resource alone may not be sufficient to determine what dimension of the resource to scale. For example, as noted above, the customer 526 may separately scale the read and write provisioned throughputs of a database service table. In general, a resource may have more than one scalable dimension that may be changed independently.

Therefore, in addition to service namespace and resource ID, the scaling service 502 may require the customer 526 to specify which "dimension" of a resource the customer 526 wants to scale. As an example, a database service table, or global secondary index (GSI), may have read and write provisioned throughputs that may be changed independently and that may be regarded as scalable dimensions. For database service tables and GSIs, there may be at least two scalable dimensions for read and write provisioned throughputs, respectively. The customer 526 may define maximum and minimum boundaries and scaling policies per table/GSI and per scalable dimension.

Determination of whether to trigger a scaling policy and the scaling service 502 may be made by a source external to the scaling service 502, such as the telemetry service 506. That is, a scaling policy may be attached to a telemetry service alarm of the telemetry service 506 by the customer 526, and the scaling policy may be triggered by the telemetry service alarm. For example, the customer 526 could create a telemetry service alarm with the telemetry service 506 on any measurement being aggregated by the telemetry service (e.g., processor utilization). At the telemetry service 506, one or more thresholds may be specified for the telemetry service alarm; for example, the customer 526 may specify that the telemetry service alarm should fire when processor utilization reaches 50 percent utilization. Once the telemetry service alarm is set up, the customer 526 may attach any scaling policy to it, such that when the alarm fires (i.e., the measurement value exceeds the threshold), it may trigger the scaling policy.

The telemetry service 506 may call the scaling service 502 to invoke a scaling policy when an associated alarm enters a state that triggers the scaling policy. In some cases, the telemetry service 506 may periodically (e.g., every minute) invoke the scaling policy for as long as the alarm remains in that state. In some embodiments, the telemetry service 506 invokes a scaling policy only once per alarm state, and then a workflow may be performed after performing a scaling action to check the alarm state to determine if further scaling is needed.

As a result of the alarm firing, a notification of the alarm is sent to the scaling service frontend 514. The scaling service frontend 514 passes this information to the scaling service backend 528, which then fetches the corresponding scaling policy from the database service 520. The scaling service backend 528 examines the parameters in the retrieved scaling policy, obtains the current capacity of the resource to be scaled from the appropriate resource service, and performs the calculations specified by the scaling policy in view of the current capacity to determine that the new desired capacity for the resource needs to be scaled. Note that for some policy types, like a step policy, the scaling service 502 will get information about the metric in order to determine which steps in the scaling policy to apply to the resource. For example, the customer 526 may create a scaling policy for scaling up and down a resource based on a metric that is an indication of application load or traffic volume by setting up an alarm to trigger at certain thresholds of application load or traffic volume and attaching a policy to it. In this example, triggering the alarm will invoke the policy so that when traffic volume goes up and down, the resource will be scaled as dictated by the scaling policy.

In some embodiments, the telemetry service 506 sends alarms in response to the occurrence of certain specified events (i.e., telemetry events). Examples of such events include sending a message via a message queuing service or executing certain functions in a software container. Additionally or alternatively, in some embodiments scaling policies can be triggered according to a predefined schedule. For example, the customer 526 may set a scaling schedule that triggers a scaling policy at 6:00 PM every day. Interruption of the telemetry service 506 may result in delayed scaling due to the delay in a telemetry service alarm being sent to the scaling service 502 to trigger execution of a scaling policy. Although metric-based alarms may be impacted due to unavailability of the telemetry service 506, on-demand (e.g., the customer 526 via the scaling service frontend 514) and scheduled scaling (e.g., command sent to the scaling service frontend 514 according to a schedule) would not be affected.

Upon receiving a call from the telemetry service 506 to invoke a scaling policy, the scaling service backend 528 may synchronously calculate the new desired capacity for the scalable target, and the scaling service workflow manager 524 may asynchronously set the desired capacity for the scalable target. The scaling service workflow manager 524 may contain workflow and activity definitions that are used when effecting and monitoring changes to the target service. Workflows may be launched by the scaling service workflow manager 524, which may utilize a control plane service to record, in the database service 520, interactions with the target service. Besides setting desired capacity, the scaling service workflow manager 524 may also record scaling activities. In some embodiments, the scaling service workflow manager 524 can also send notifications and/or publish events. The scaling service backend 528 may be responsible for starting workflow executions (e.g., via the workflow service 522). In some embodiments, a message queuing service is located between the scaling service backend 528 and the workflow service 522 for queuing workflow commands.

The database service 520 may be used to track the state of scaling activities, to store identities of scalable targets registered by the customer 526, and to store scaling policies defined by the customer 526. The scaling policies may be stored with the database service 520 in any applicable format, such as in a JavaScript Object Notation format in a table with the database service 520. However, the scaling policy may be automatically generated by the scaling service 502 so that the customer 526 need not directly provide the scaling policy. If the database service 520 has an outage, various methods may be performed to minimize adverse impact to the scaling service 502. For example, scalable targets and scaling policies may be cached; in this manner, new entities may not be created but the scaling service 502 will continue to automatically scale existing scalable targets. As another example, recording of the scaling history may be made as a best effort; in other words, accuracy of the scaling history may be traded for availability, and "dangling" scaling activities may be closed. As still another example, the process of writing scaling tasks to the database service 520 may be bypassed; for example, the scaling service backend 528 may put, in a queue of a message queuing service, a message for a scaling task that includes all of the data that the workflow service 522 needs in the message. Note that although FIG. 5 shows the database service 520 as residing external to the scaling service 502, it is contemplated that, in some embodiments, the functionality provided by the database service 520 may be found wholly or partially within the scaling service 502.

The resource services 504 may be services provided by a computing resource service provider hosting resources with scalable dimensions. If a resource service has a problem, scaling may be impacted as the scaling service 502 may be unable to get the current capacity of or update the resources of the resource service. In some embodiments, the resource service is able to continue accepting and queuing scaling requests even if the resource service is offline, although processing such requests may be impacted.

The customer 526 may execute a scaling policy in a variety of ways. For example, in some embodiments, the customer 526 can execute the policy using a command line interface, a software development kit, or a console interface (e.g., accessible via a browser). As another example, in some embodiments the customer 526 can have the policy invoked in response to receiving an alarm from the telemetry service 506. As still another example, the customer 526 can have the policy invoked by the occurrence of an event detected by the telemetry service 506. In yet another example, the customer 526 can have the policy invoked according to a schedule specified to the telemetry service 506 by the customer 526.

Each scaling action (i.e., each change made to a resource's scalable dimension) may have associated metadata, such as a unique activity identifier (ID), resource URI, description, cause, start time, end time, and/or status. This associated metadata may be recorded/logged with the database service 520 in conjunction with each scaling action performed by the scaling service 502. The customer 526 may subsequently query the scaling activities of a particular resource service by its URI. Scaling actions may cause a telemetry service event to be published.

After each change to the scalable dimension (e.g., the desired task count of the service construct), the system may check the current alarm state to see if additional scaling is required. The precise behavior is as follows:
  If scaling policy is an action for OK state (i.e., maintain current state), no action is taken.
  If scaling policy is an action for ALARM or INSUFFICIENT DATA state:
    Get the alarm's current state.
    If the alarm's current state matches the configured policy:
      If timeout has expired, reset alarm state to OK (this ensures that if the state goes into ALARM or INSUFFICIENT DATA again, the telemetry service 506 may call the scaling service 502 to execute the policy again.
    If timeout has not expired:
      If current time is after cooldown expiration time, call InvokeAlarmAction( ) to execute the policy again.
      Otherwise, wait an amount of time (e.g., one minute) and repeat the process step, starting from getting alarm state (e.g., an alarm is evaluated every minute).

If the scaling policy is triggered manually by the customer 526, by the occurrence of an event or according to a schedule, rather than by an alarm of the telemetry service 506, the desired task count of the service construct may be changed based on the current running count and the scaling adjustment specified in the policy, within the minimum and maximum capacity. The scaling service 502 may apply the scaling adjustment specified in the policy to the current running count of the service construct.

The running count may be the actual processing capacity, as opposed to the desired task count, which is what the processing capacity is supposed to be. Calculating the new desired task count from the running count may prevent excessive scaling. For example, if the scaling service 502 has increased the desired task count by 1, the alarm that triggered the scaling policy may still be active during the time that the task is being launched. However, once the new task is fully launched, the alarm may be deactivated, ensuring that the scaling service 502 does not scale-out further.

In some embodiments, scale-out is prioritized over scale-in; i.e., a scale-out will override an in-progress scale-in but not vice versa. In other embodiments, the reverse is true. An in-progress scale-in may be indicated by the running count being greater than the desired task count. In this situation, the scaling service 502 may allow a scale-out to increase the desired task count in a manner that optimally maintains application availability. Conversely, an in-progress scale-out may be indicated by the running count being less than the desired task count, in which case the scaling service 502 may not allow a scale-in to decrease the desired task count in order to optimally protect application availability.

The combination of Resource URI and Context may uniquely identify a scalable resource. Supported policy types for scaling may include "SimpleScaling," "StepScaling," and "TargetUtilizationScaling." Each policy type has its own configuration parameters. For "SimpleScaling," the policy configuration may have the following parameters:
  AdjustmentType: "PercentChangeInCapacity," "ChangeInCapacity" or "ExactCapacity."
  ScalingAdjustment: a number whose meaning depends on adjustment type; e.g., if scaling adjustment is 10 and adjustment type is percentage change in capacity, then the adjustment is plus 10 percent of actual capacity.
  MinAdjustmentMagnitude: may only be applicable when AdjustmentType is "PercentChangeInCapacity," to protect against an event where the specified percentage of the current capacity results in a very small number.
  Cooldown: allows the customer 526 to specify an amount of time to pass before allowing additional scaling actions; it starts once a scaling action has been completed, and no further scaling actions are allowed until after it has expired.

The scaling service 502 may also utilize a timeout. The timeout may serve at least two purposes. First, the scaling service 502 may utilize a timeout in a check alarm state workflow in an event that a scaling action becomes stuck for an excessive (i.e., greater than a defined threshold) period of time; for example, a service construct cluster that does not have enough capacity for new tasks may not respond to a demand to increase the number of tasks. In such an event, the alarm could remain in breach for a long time, and the timeout prevents the scaling service 502 from continually checking its state. Second, the scaling service 502 may prioritize scale-out/scale-up over scale-in/scale-down, but the scaling service 502 should not let a stuck scale-out/scale-up (e.g., due to an InsufficientCapacityException) prevent a scale-in/scale-down from occurring. Thus, a timeout may allow the scaling service 502 to unblock the scale-in. Note that in some implementations, the timeout is user configurable; whereas in other implementations the timeout is a user non-configurable value which the scaling service 502 uses to determine whether to give up on a stuck scale-out.

The scaling service 502 is designed as a layer on top of the resource services 504 that calls into those services on behalf of the customer 526. This ensures that the scaling service 502 provides the customer 526 with a consistent automatic scaling experience for all resource services. The customer 526 may first create an alarm, or the customer may choose an existing alarm, in a console of the telemetry service 506 and then apply a scaling policy to the alarm.

One scaling policy type is a "step" policy, which allows the customer 526 to define multiple steps of scaling adjustments with respect to the measurement that triggers execution of the scaling policy. For example, the customer 526 may specify to scale-up a scalable dimension of the resource if processor utilization reaches certain threshold steps. For example, the customer 526 may specify to scale-up the scalable dimension of the resource by 10 percent if processor utilization is between 50 and 60 percent. The customer may further specify to scale-up the scalable dimension by 50 percent if processor utilization is between 60 and 70 percent, scale-up the scalable dimension by 30 percent if processor utilization is above 70 percent, and so on. In this manner the customer 526 can define multiple steps and/or multiple responses with different magnitudes with respect to the specified metrics.

The API of the scaling service 502 may be designed to operate as a separate service from the resource services 504 such that it is not integrated into any particular service of the resource services 504. In this manner, the scaling service 502 is not dependent upon any particular service of the resource services 504. In order to set up a particular resource service to be scaled by the scaling service 502, the scaling service 502 simply needs information about the APIs of the particular resource service to call in order to direct the particular resource service to scale-up or down. The scaling service 502 is able to maintain this independence by specifying which dimension of which resource of the particular resource service to scale and whether to scale-up or down; the logistics of how the particular resource should be scaled (e.g., which tasks to terminate, which container instances that do tasks should be launched, etc.) in response to direction from the scaling service 502 is determined by the particular resource service itself.

In some embodiments, additional components not pictured in FIG. 5 may be present within the scaling service 502. For example, in certain embodiments a control plane service is present between the scaling service workflow manager 524 and external services such as the authentication service 516 and the database service 520. For example, the control plane service may provide API operations for updating scaling history. Furthermore, having certain functions performed by the control plane instead of the scaling service backend 528 may mitigate performance impact if the scaling service backend 528 receives requests for many data retrieval operations from the customer 526. With a separate control plane, the effect on the scaling service 502 of the increased volume of retrieval operations is minimized. The control plane service may exist in addition to the backend service and may track and record all persistent service (e.g., database service 520, authentication service 516, etc.) interactions. In other embodiments, however, control plane functionality is integrated into the scaling service backend 528.

Also in some embodiments, service adapters are present within the scaling service 502 between the resource services 504 and certain scaling service components, such as the scaling service backend 528 and the scaling service workflow manager 524. The service adapters may be responsible for routing the scaling request through appropriate APIs for the target service. In alternative embodiments, the service adapter functionality is present within the scaling service workflow manager 524 and/or the scaling service backend 528. However, because the scaling service 502 is decoupled from the resource services 504, the scaling service 502 relies on a response from the particular resource service in order to determine whether a scaling request has been fulfilled.

The workflow service 522 may be a collection of computing devices and other resources collectively configured to perform task coordination and management services that enable executing computing tasks across a plurality of computing environments and platforms. The workflow service 522 may provide a workflow engine used to effect asynchronous changes in the scaling service 502. The workflow service 522 may be used to update target resources and may also be used as a lock to control concurrent scaling requests. The workflow service 522 may track the progress of workflow execution and perform the dispatching and holding of tasks. Further, the workflow service 522 may control the assignment of hosts or physical or virtual computing machines used for executing the tasks. For example, a user may define a workflow for execution such that the workflow includes one or more tasks using an API function call to the workflow service 522. Further, the user may specify task order for the workflow, conditional flows, and timeout periods for restarting or terminating the execution of the workflow. In addition, execution loops for the workflow may be defined. Workflow execution may be asynchronous and may be preceded by synchronous execution of database writes. Note that although FIG. 5 shows the workflow service 522 as residing external to the scaling service 502, it is contemplated that, in some embodiments, the functionality provided by the workflow service 522 may be found wholly or partially within the scaling service 502.

Interruption of the workflow service 522 may cause delayed scaling because the asynchronous processing of scaling requests may be adversely impacted. One way to mitigate delayed scaling may be to do only what is absolutely required to scale synchronously via the scaling service frontend 514. At a minimum, the scaling service may attempt to set desired capacity and record scaling history. From a performance standpoint, this may be acceptable because it just requires an API call to the resource service owning the resource to be scaled and a minimum of extra writes to the database service 520. Although this may result in losing features of workflow service 522 (e.g., retry mechanism, history tracking, etc.), at least the system will perform the operations that are required to scale.

The scalable targets (i.e., scalable resources) may reside with the resource services 504. A scalable target may be uniquely identified from the triple combination of service (e.g., service namespace), resource (e.g., resource ID), and scalable dimension. The resource services 504 represent the services that actually manage the resources that the customer 526 wants to be automatically scaled. In this manner, the scaling service 502 exists as a separate service from the resource services 504 whose resources are caused to be scaled by the scaling service 502. The resource services 504, as noted, may include services such as a software container service, a database service, a streaming service, and so on. The scaling service 502 may take the scaling policies created by the customer 526 and, when the scaling policies are invoked (e.g., by an alarm from the telemetry service 506), the scaling service 502 may perform the calculations to determine, given the particular policy and the current capacity of the resource, whether to increase or decrease the capacity to a new value. In order to get the current capacity of the resource, the scaling service backend 528 may make a service call to the resource service 504 of the resource to be scaled. In response, the resource service 504 may provide the scaling service 502 with the current capacity (e.g., "five tasks").

The scaling service workflow manager 524 may then make a service call to the resource service 504 that actually owns the resource to be scaled to cause the scaling action to be performed. In other words, because the scaling service 502 is a separate service from the resource service 504 that hosts the resources, the scaling service 502 will make service calls to the resource service that owns the resource in order to get the state of the resource and also to change the state of the resource.

The authentication service 516 may be a service used for authenticating users and other entities (e.g., other services). For example, when a customer of a computing resource service provider interacts with an API of the computing resource service provider, the computing resource service provider queries the authentication service 516 to determine whether the customer is authorized to have the API request fulfilled. In the process of creating a scaling policy, the customer 526 may assign the scaling service 502 to a role that authorizes fulfillment of certain requests, and the scaling service 502 may then assume that role in order to make appropriate requests to cause a resource service associated with the policy to scale resources. In this manner, the role (supported by a role management service) gives the scaling service 502 the necessary permission to access the resource that lives in the resource services 504.

The customer 526 may create a role supported by a role management service through an interface console. The interface console may allow the customer 526 to click an appropriate button or consent checkbox in the interface console, and the underlying system may create the role with the necessary permissions. The token service 518 may provide the scaling service 502 with session credentials based on a role or roles specified by the customer 526. These session credentials may be used by the scaling service 502 to interact with the resource services 504 on behalf of the customer 526. The token service 518 may provide a token to the scaling service 502 that the scaling service may include with requests that provide evidence that the scaling service 502 has been granted the appropriate role to cause scalable dimensions of a resource in the resource services 504 to be manipulated. The role may be utilized by the automatic scaling service to call a resource service's APIs on behalf of the customer 526.

Interruption of the token service 518 may result in the scaling service 502 being unable to assume a role supported by a role management service, with the scaling service 502 thereby being unable to scale a resource of the customer 526. In some embodiments, the scaling service 502 caches temporary credentials (e.g., they may be valid for 15 minutes, etc.) that the scaling service 502 can use when assuming a role.

As described in the present disclosure, the scaling service 502, itself, does not determine whether conditions that trigger a scaling policy are met. Rather, an external entity, such as the telemetry service 506, determines whether conditions have been met (e.g., by an alarm specified by the customer 526) and, if met, sends a notification to the scaling service 502 that triggers execution of the appropriate scaling policy. Thus, a scaling policy may be triggered by an alarm sent by this telemetry service 506, by the occurrence of an event that triggers notification from an external entity, on demand by the customer 526, according to a notification that is sent to the scaling service 502 according to a schedule, or by some other external notification.

As noted, in some embodiments the scaling service supports application scaling. In some examples, "application scaling" may refer to a grouped set of resources from different services (e.g., comprising an application of the customer, such as a virtual machine from a virtual computer system service and a database from a database service). Through the scaling service interface, the customer 526 may group different resources together under a common name for scaling. For example, if the customer 526 has resources that use a database service, virtual computing system service, load balancing service, and a streaming service, the customer 526 may use a group scaling policy to scale-up or scale-down scalable dimensions of the resource of the group based on a particular trigger (e.g., alarm of the telemetry service 506). Based at least in part on the policy, the scaling service 502 knows which scaling commands to send to which service. In this manner, the customer can group together some or all of the customer's services/resources and perform scaling for that group of services as opposed to scaling resources individually. For example, a scaling policy triggered by a telemetry service alarm may specify to increase the group by three more database service instances, 10 more virtual machines, and four load balancers.

Additionally or alternatively, in some embodiments the scaling service 502 supports "target tracking metrics." In some examples, "target tracking metrics" refers to measurements that the customer 526 wants to keep within a specific range. This simplifies the user experience because the customer 526 simply specifies the metric of a resource and the particular range, and the scaling service 502 determines how to scale the resource to keep the measurements within the particular range. For example, if the scalable dimension is processor utilization and the customer specifies to keep the scalable dimension between 40 and 60 percent, the scaling service 502 determines how to keep the measurements within this range. Consequently, the customer is spared having to define, for example, within a first range to scale-up by a first amount, within a second range to scale-up by a second amount, and so on.

Figure 6:
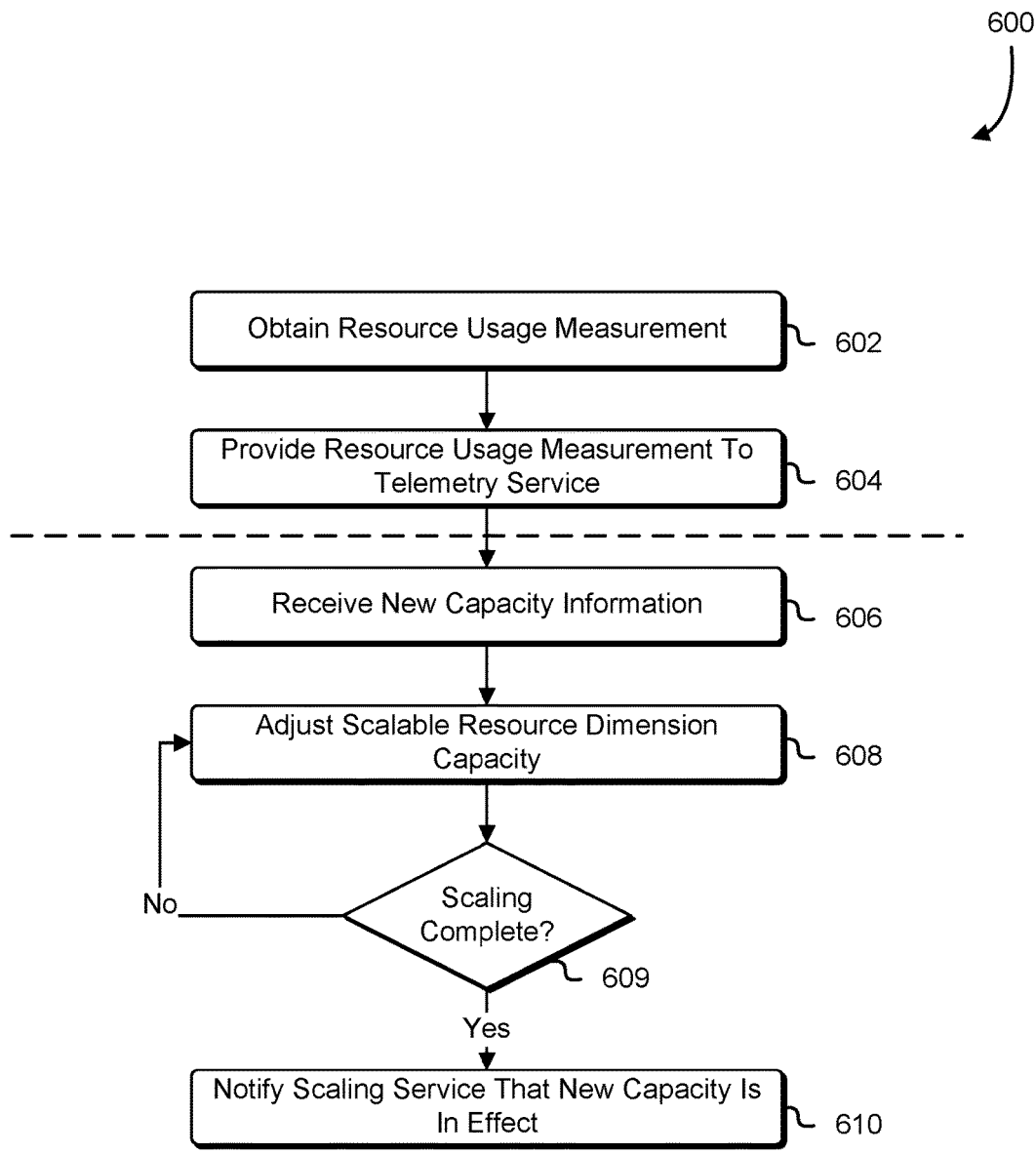
FIG. 6 is a block diagram that illustrates an example of scaling a scalable resource service from the perspective of the scalable resource service in accordance with an embodiment.

FIG. 6 is a block diagram illustrating an example of a process 600 for a scalable resource service to be scaled in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 9:
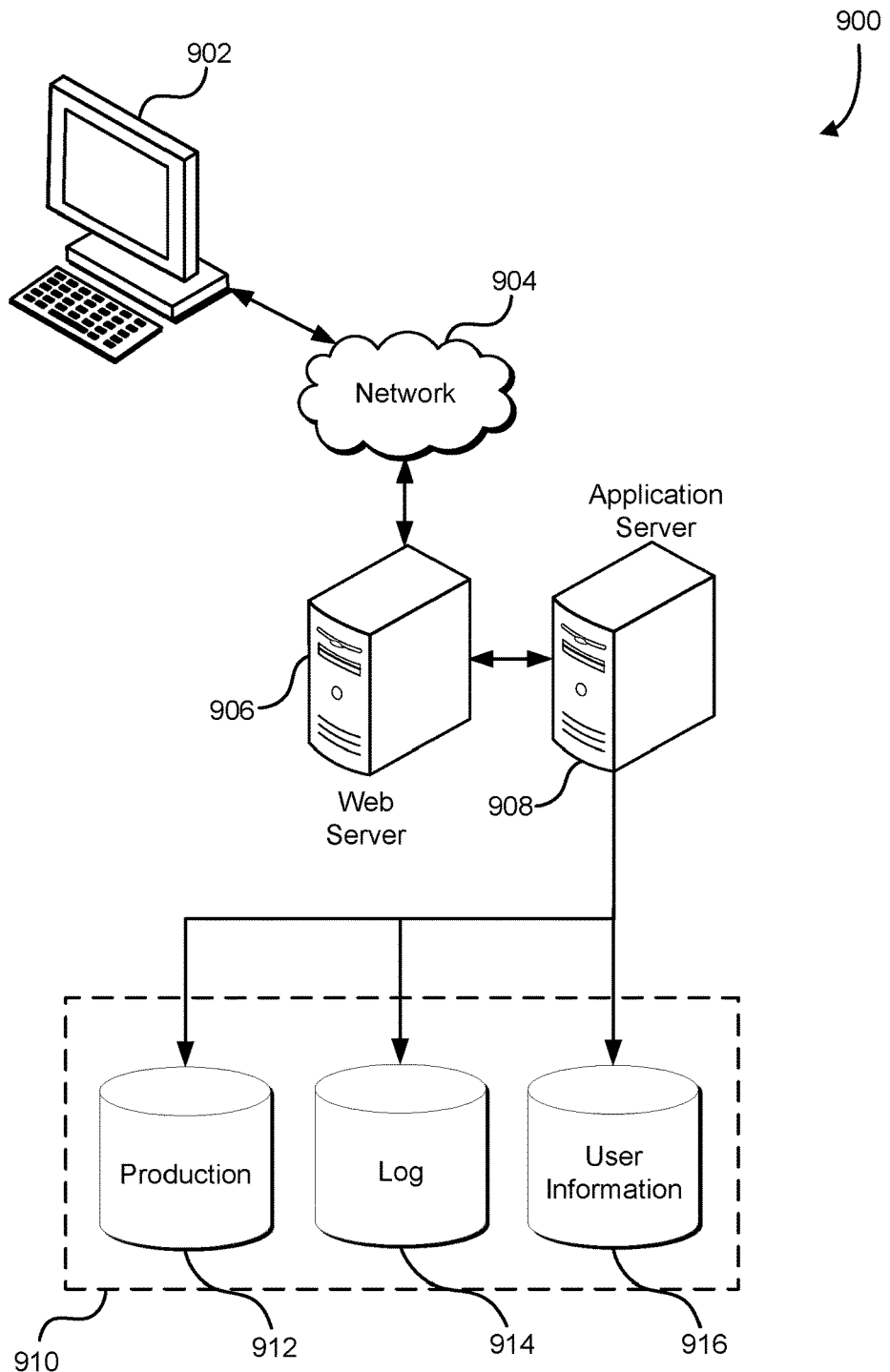
FIG. 9 illustrates an environment in which various embodiments can be implemented.

For example, some or all of process 600 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 600 includes a series of operations from the perspective of a scalable resource service, such as the scalable resource service 102 or the scalable resource service 202 of FIGS. 1 and 2, respectively, wherein the scalable resource service provides usage measurements to a telemetry service, receives new capacity information, modifies the target to be scaled in accordance with the new capacity, and notifies the scaling service that the new capacity is in effect.

In 602, the scalable resource service obtains a measurement reflecting a state of resource usage. Examples of such measurements include network utilization, network bandwidth, latency measurements, number of hops in a path from a source to a destination in a network, a frequency of communication between services or software applications, an amount of data transferred between services or software applications, network throughput, health levels for persistent storage or for servers, duration of task execution, disk input/output rates, processor utilization, frequency of processor utilization spikes, amount of memory utilized, request response time, and power consumption. In 604, the scalable resource service provides this measurement to a telemetry service where a customer-owner of the scalable resource service has configured an alarm to trigger if the measurements provided fulfill certain criteria (e.g., going above or below a threshold). Note that it is contemplated that in some implementations the measurements may be provided to the telemetry service from a service other than the scalable resource service (e.g., a monitoring service or agent). Note also that, although resource utilization being measured typically has a relationship with the resource dimension being scaled (e.g., a number of computing instances available being related to request response time), this need not be the case, and the measurements therefore need not be related to the resource dimension being scaled.

In 606, the scalable resource service receives scaling information generated by a scaling service. In some embodiments, the scaling information may be received directly from the scaling service, whereas in other embodiments the scaling information may be received indirectly via an API management service or event-driven compute service. Note that the dashed line above 606 indicates that the scaling information may be received as an indirect result of the operations of 604, and that the operations of 602-04 may be repeated one or more times before the scaling information is received by the scalable resource service. If the new capacity of the resource dimension indicated by the scaling information does not match the current capacity of the resource dimension, the new capacity information may have been computed by a scaling service of the present disclosure. In 608, the scalable resource service performs actions to cause the scalable resource dimension to match the new capacity. Note that if the new capacity already matches the current capacity, no action need be taken. Note also that in various embodiments a match does not necessarily require equality. For example, two values may match if they are not equal but are mathematically equivalent. As another example, two values may match if they correspond to a common object (e.g. value) or are in some predetermined way complementary and/or they satisfy one or more matching criteria. Generally, any way of determining whether there is a match is acceptable.

In 609, the scalable resource service determines whether further adjustment to the scalable resource dimension capacity needs to be performed in order to meet the new capacity. If scaling is not complete, the scalable resource service may return to 608 and make further adjustments. For example, the scalable resource service may require several calls to an API that increases the scalable dimension by one unit each time it is called. Upon determination that scaling is complete, the scalable resource service may proceed 610.

Lastly, in 610, the scalable resource service notifies the scaling service that the current capacity now matches the new capacity. In some cases, this may involve a response to the entity from which the new capacity information was received in 606 that includes the current capacity. In some scenarios, the entity may be the scaling service itself, in other, the entity may be an event-driven function, and in still other, the entity may be a service or other proxy between the scalable resource service and the scaling service. In other cases, as described in the present disclosure, notifying the scaling service may involve a response to a separate request for the current capacity of the scalable dimension. In some of these cases, this response may be made through an API management service and/or an event-driven function. Note that one or more of the operations performed in 602-10 may be performed in various orders and combinations, including in parallel.

Figure 7:
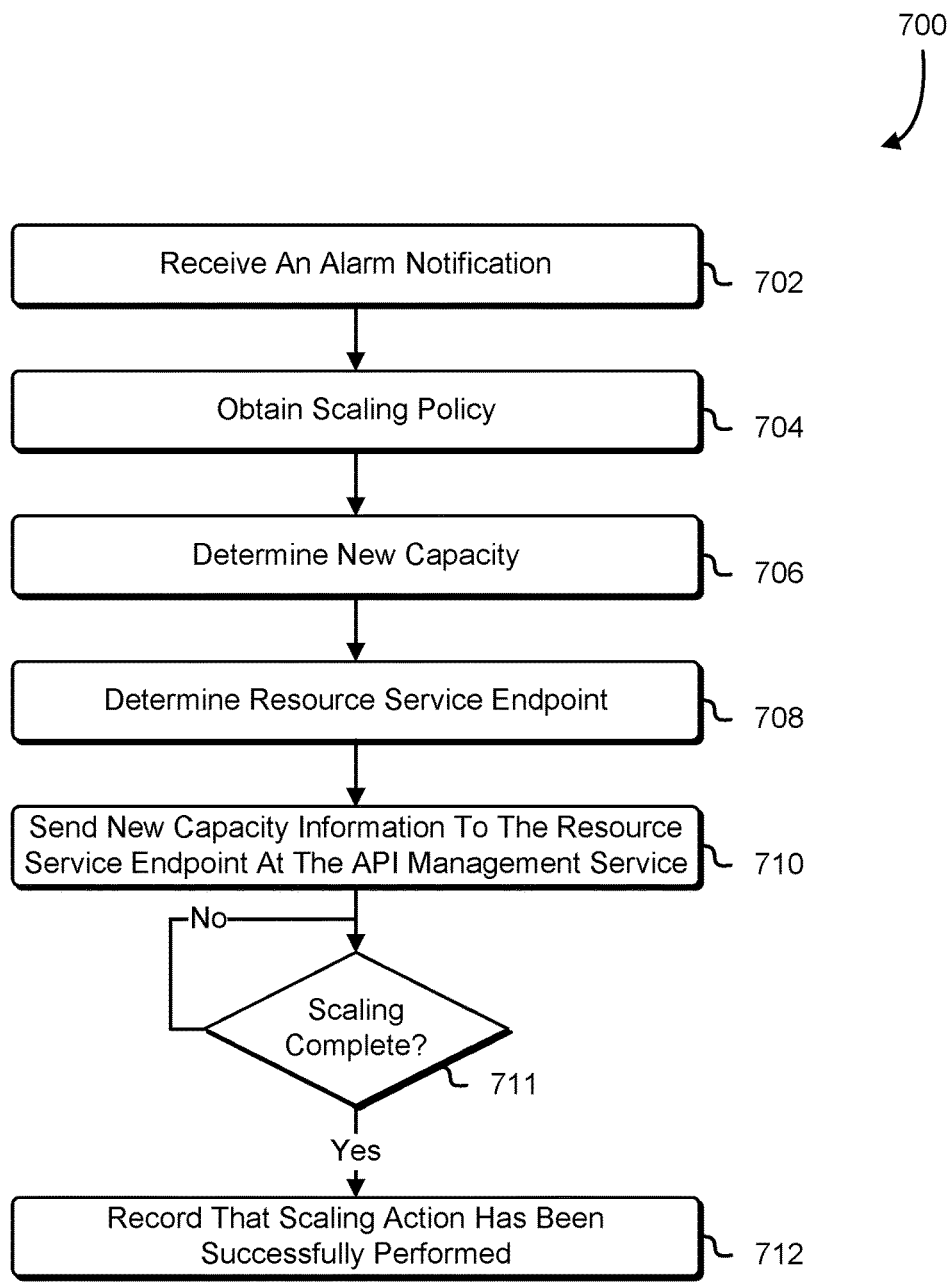
FIG. 7 is a block diagram that illustrates an example of scaling a scalable resource from the perspective of a scaling service in accordance with an embodiment.

FIG. 7 is a block diagram illustrating an example of a process 700 for scaling a scalable target of a scalable resource service in accordance with various embodiments. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 700 includes a series of operations from the perspective of a scaling service that receives an alarm associated with a scaling policy, calculates a new capacity based on the current capacity and the scaling policy, determines the scalable resource service endpoint to which to send the new capacity, sends the new capacity, and determines that the scaling has been successfully performed.

In 702, the scaling service receives an alarm notification, such as the alarm notification 108 for the alarm notification 208 of FIGS. 1 and 2 respectively, that corresponds to a preconfigured scaling policy. In some cases the alarm notification may be received from a telemetry service, such as the telemetry service 106 or the telemetry service 206; whereas in other cases the alarm notification may be received from some other entity, such as a customer-owned service, or may be a result of a direct command by the customer him/herself. In some cases, the alarm notification may include a current capacity of the scalable dimension being scaled.

In 704, the scaling service obtains the scaling policy that corresponds to the particular alarm. Based on the rules specified in the scaling policy and the current capacity of the scalable dimension being scaled, the scaling service computes a new capacity in 706. Note, in some implementations where the current capacity of the scalable dimension is not included with the alarm notification, the scaling service may request the current capacity of the scalable dimension from the scalable resource service. As described in the present disclosure, if the scalable resource service does not support direct requests from the scaling service, the scaling service may utilize an API management service and/or an event-driven function to transform the current capacity request into a format compatible with the scalable resource service.

In 708, the scaling service determines the URI that corresponds to the endpoint for the target being scaled. This endpoint may be determined from the scaling policy. That is, the URI represents a dimension of a scalable resource registered with the scaling service. As a result of being registered with the scaling service, the URI may have a corresponding resource ID. The scaling policy may specify the resource ID, which allows the scaling service to send to the resource associated with these resource ID, which in this case would be the URI at the API management service, such as the API management service 114 or API management service 214 of FIGS. 1 and 2, respectively.

In 710, the scaling service sends an API call to the URI at the API management service where the API call includes scaling information such as the new capacity computed in 706. Finally, in 711 the scaling service determines whether the scaling action has been performed at the resource service successfully such that the current capacity meets the new capacity calculated in 706. In some cases, the determination may be made based on a response received as a result of making the API call in 710. In other cases, the determination may be made as a result of receiving, from the resource service or other entity, an API call notifying the scaling service that the scaling action has been successfully fulfilled. In still other cases, the determination may be made by the scaling service making a request to the resource service or some proxy entity for the current capacity and, after receiving a response, comparing the current capacity with the new capacity calculated in 706 and, if they match, the scaling action may be determined to be successful. However, it is contemplated that other methods of determining whether the scaling action has been successfully performed may be used in 711. If the scaling action is not determined to be successful, the scaling service may continue to poll or wait until receiving confirmation that the scaling action has been performed successfully or until a timeout occurs, in which case the scaling service may log an error. Upon determining that the scaling action has been successfully performed, in 712 the scaling service may record, such as in a log file or database that stores the scaling history, that the scaling action was successfully performed. Note that one or more of the operations performed in 702-12 may be performed in various orders and combinations, including in parallel.

Figure 8:
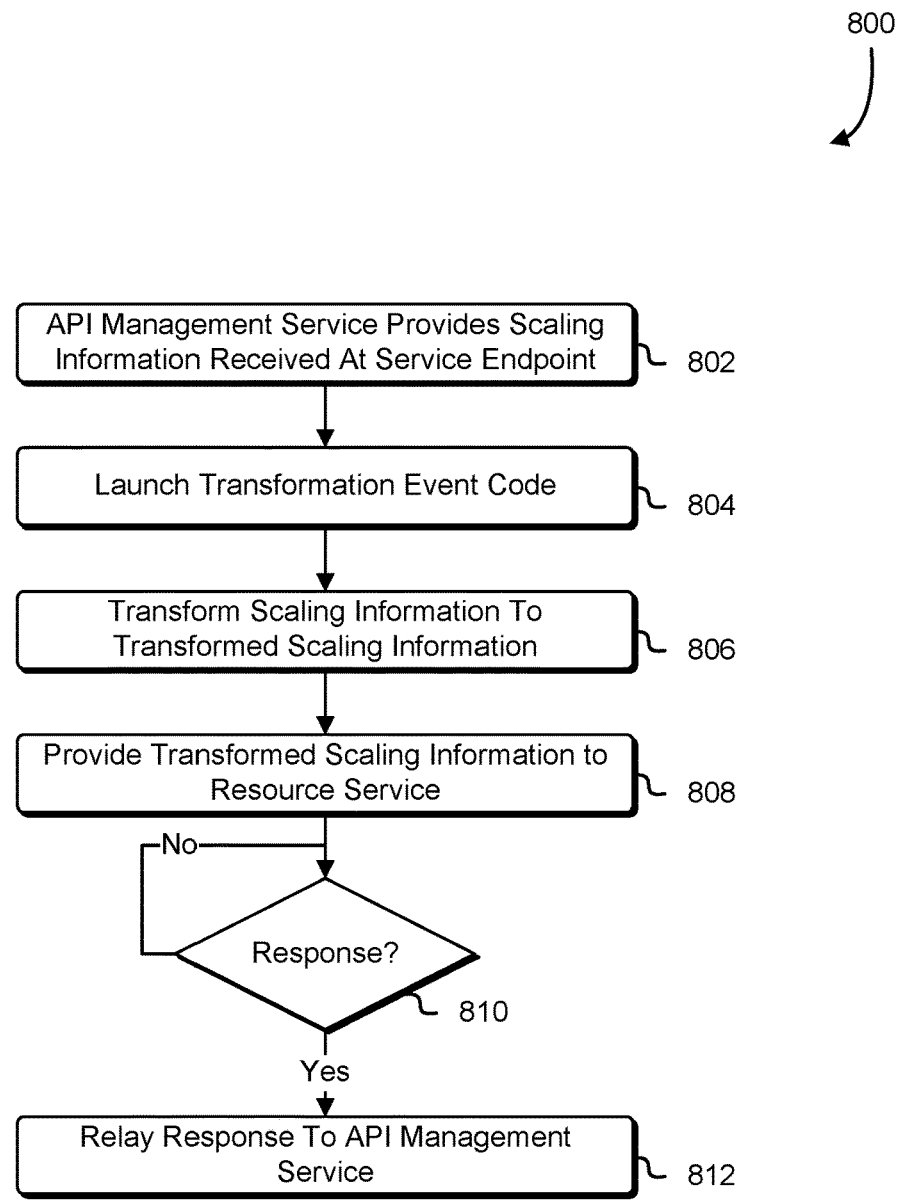
FIG. 8 is a block diagram that illustrates an example of scaling a scalable resource service from the perspective of an event-driven compute service in accordance with an embodiment.

FIG. 8 is a block diagram illustrating an example of a process 800 for scaling a scalable target in accordance with various embodiments. Some or all of the process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 800 includes a series of operations from the perspective of an event-driven compute service wherein receipt of scaling information at a resource service endpoint of a API management service is an event that triggers launching transformation code that transforms scaling information into transformed scaling information, and the transformation code passes the transformed scaling information to the resource service.

In 802, an API management service, upon receipt of the scaling information at an endpoint that corresponds to the target being scaled, invokes the event-driven compute service to launch transformation event code that corresponds to the endpoint. The API management service provides the scaling information as input to the transformation event code. In 804, the event-driven compute service launches an event-driven function, namely the transformation code for transforming the scaling information into a form usable to scale the target. In 806, the transformation code causes the event-driven compute service to transform the scaling information into transformed scaling information usable to scale the target. For example, "desired_capacity=100" might be transformed to "required_units=100." As another example, for a resource service that can add/expand or remove/reduce capacity but does not have a concept of a total capacity, "desired_capacity=100" might result in the transformation code causing the event-driven compute service to request a current capacity from the resource service and determine by how much the capacity should be adjusted. Assuming the resource service replies that current capacity is 136, the transformed scaling information may be something like "reduce_size_by=36." As yet another example, for a resource service that adjusts capacity incrementally, if "desired_capacity=25" and the event-driven compute service determines that current capacity is 15, the transformation code may generate 10 commands of "increase-Resource( )".

In 808, the event-driven compute service provides the transformed scaling information to the resource service in a manner that causes the resource service to scale in accordance with the transformed scaling information. For example, the event-driven compute service may make an API call to the resource service with parameters determined from the scaling information, thereby causing the resource service to scale in accordance with the transformed scaling information in fulfillment of the API call.

In 810, the event-driven compute service waits for a response to the API call from the resource service; for example, until a timeout occurs. Upon receiving a response, the event-driven compute service may proceed to 812 and provide the response back to the API management service referenced in 802. In some embodiments, the transformation event code may transform the response into a transformed response that can be interpreted by the scaling service. Note that one or more of the operations performed in 802-08 may be performed in various orders and combinations, including in parallel. In various implementations, not all of the operations shown for the process 800 may be performed, and it is contemplated that depending on implementation alternative operations may be performed in lieu of one or more operations shown. For example, in some implementations the process 800 may terminate after the operations of 808, rather than continuing through operations 812.

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 904 can be enabled by wired or wireless connections and combinations thereof. In this example, the network 904 includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 902 to provide the content in one or more forms including, forms that are perceptible to the user audibly, visually and/or through other senses. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 904. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may be configured, for instance, with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising at least one computing device having one or more processors and memory including instructions that, as a result of execution by the one or more processors, cause the system to implement one or more services, wherein the one or more services include:
   a telemetry service of a computing resource service provider environment that:
      determines that a measurement of utilization of a resource with a scalable dimension triggers an alarm, where the measurement is obtained from a resource service operated by a customer, located outside of the computing resource service provider environment, and containing the resource; and
      provides an alarm notification to a scaling service;

the scaling service of the computing resource service provider environment that:
  obtains a scaling policy associated with the alarm; and
  makes an application programming interface call to an endpoint of the resource service at an application programming interface management service, the application programming interface call including scaling information associated with a scaling action; and
the application programming interface management service that:
  receives, at the endpoint from the scaling service, the application programming interface call indicating the scaling action, the application programming interface call when fulfilled by the resource service causes the resource service to modify a capacity of the scalable dimension in accordance with the scaling action; and
  provides the scaling information from the application programming interface call the resource service.

2. The system of claim 1, wherein:
the one or more services further include an event-driven compute service that triggers an event-driven function to execute based at least in part on the scaling information, the event-driven function causing the event-driven compute service to:
  receive, from the application programming interface management service, the scaling information;
  transform the scaling information into transformed scaling information; and
  provide the transformed scaling information to the resource service.

3. The system of claim 1, wherein the scaling service further:
  sends a request for a current capacity of the scalable dimension; and
  determines that the current capacity is in accordance with the scaling information.

4. The system of claim 3, wherein:
the scaling service sends the request for the current capacity to the application programming interface management service; and
the one or more services further include an event-driven compute service that executes an event-driven function that:
  transforms the request into a transformed request;
  submits the transformed request to the resource service;
  transforms a response from the resource service into the current capacity; and
  provides the current capacity in the response to the request for the current capacity.

5. A computer-implemented method, comprising:
determining that a measurement associated with a resource triggers an alarm specified by a customer operating the resource, the resource not being provided to the customer by a computing resource provider that hosts one or more computer systems in a computing resource service provider environment distinct from a second computing resource environment that hosts the resource operated by the customer;
obtaining a scaling policy associated with the alarm;
determining, by a scaling service within the computing resource service provider environment and based at least in part on the scaling policy, a scaling amount;
providing, in an application programming interface call, the scaling amount to an endpoint associated with the customer, the endpoint being associated with the resource and within the second computer resource environment;
obtaining, by a telemetry service within the computing resource service provider environment, a current capacity of a scalable dimension of the resource; and
determining that scaling was successful, the determining made at least in part by comparing the current capacity with the scaling amount.

6. The computer-implemented method of claim 5, wherein the computer-implemented method further includes making, from the endpoint, a second application programming interface call to the resource, the application programming interface call including the scaling amount and causing, upon receipt, the resource to modify the current capacity of the scalable dimension based at least in part on the scaling amount.

7. The computer-implemented method of claim 5, wherein the resource is a third party resource that utilizes resources provided by the computing resource provider.

8. The computer-implemented method of claim 5, wherein the measurement is a measure of resource utilization received from the resource.

9. The computer-implemented method of claim 5, wherein providing the scaling amount to the endpoint causes execution of an event-driven function that transforms the scaling amount into a format compatible with the resource to scale the scalable dimension in accordance with the scaling amount.

10. The computer-implemented method of claim 5, further comprising registering an application programming interface definition to associate the application programming interface definition with the endpoint.

11. The computer-implemented method of claim 10, further comprising:
providing an application programming interface testing system to the customer; and
sending, to the application programming interface testing system, a second application programming interface call that includes information usable by the customer to confirm that the application programming interface definition is usable to cause the scaling amount to be output in a format that is usable to determine a scaling action for the resource.

12. The computer-implemented method of claim 10, further comprising:
providing an application programming interface testing system to the customer;
sending, to the endpoint from the application programming interface testing system, a second application programming interface call that corresponds to the application programming interface definition; and
notifying the customer that the second application programming interface call successfully functioned.

13. A set of one or more non-transitory computer-readable storage media having stored thereon executable instructions that, as a result of execution by one or more processors of a computer system, cause the computer system to at least:
receive a scaling notification that includes a current capacity for a scalable target associated with a resource operated by a customer, the scaling notification received from a first computing environment managed at least in part by the customer and including the resource that is distinct from a set of resources included in a computing resource service provider environment including the computer system;

obtain from a first resource of the set of resources of the computing resource service provider environment a policy associated with the scaling notification;

compute, by a second resource of the set of resources of the computing resource service provider environment and based at least in part on the policy and the current capacity of the scalable target, a new capacity for the scalable target; and make, in an application programming interface call, a scaling request to an application programming interface endpoint for the scalable target within the first computing environment, the scaling request including a new capacity for the scalable target, thereby causing, upon receiving the application programming interface call, the current capacity of the scalable target to change to the new capacity.

14. The set of one or more non-transitory computer-readable storage media of claim 13, wherein the application programming interface endpoint corresponds to a uniform resource indicator.

15. The set of one or more non-transitory computer-readable storage media of claim 13, wherein the scaling notification is received as a result of certain resource usage reaching a value relative to a threshold.

16. The set of one or more non-transitory computer-readable storage media of claim 13, wherein:

the computer system is a first computer system; and the executable instructions that further include executable instructions that, as a result of execution by one or more processors of a second computer system, cause the computer system to:

receive a measurement corresponding to resource utilization;

determine that the measurement fulfills criteria that triggers an alarm; and provide the scaling notification to the first computer system.

17. The set of one or more non-transitory computer-readable storage media of claim 13, wherein the scaling notification is received as a result of an occurrence of an event specified by a customer associated with the scalable target.

18. The set of one or more non-transitory computer-readable storage media of claim 13, wherein:

the scaling request is in an incompatible format for determining a scaling action for the scalable target; and making the scaling request to the application programming interface endpoint causes a proxy between the computer system and the resource to:

transform the scaling request into a transformed scaling request that is in a format that is usable to determine the scaling action for the scalable target; and provide the transformed scaling request to the resource, thereby causing the current capacity of the scalable target to change to the new capacity.

19. The set of one or more non-transitory computer-readable storage media of claim 13, wherein the first resource of the set of resources is a scaling service provided by the computing resource service provider.

20. The set of one or more non-transitory computer-readable storage media of claim 13, wherein the second resource of the set of resources is a telemetry service provided by the computing resource service provider.

* * * * *